(12) United States Patent
Wu et al.

(10) Patent No.: US 11,063,874 B2
(45) Date of Patent: Jul. 13, 2021

(54) FORWARDING PATH ADJUSTMENT METHOD, APPARATUS, AND SYSTEM

(71) Applicant: Huawei Technologies Co., Ltd., Shenzhen (CN)

(72) Inventors: Nan Wu, Beijing (CN); Shunwan Zhuang, Beijing (CN); Jing Liu, Beijing (CN); Yuan Rao, Beijing (CN); Haibo Wang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 164 days.

(21) Appl. No.: 16/519,917

(22) Filed: Jul. 23, 2019

(65) Prior Publication Data
US 2019/0349307 A1    Nov. 14, 2019

Related U.S. Application Data

(63) Continuation of application No. PCT/CN2017/110188, filed on Nov. 9, 2017.

(30) Foreign Application Priority Data

Jan. 24, 2017    (CN) .......................... 201710055193.4

(51) Int. Cl.
*H04L 12/741* (2013.01)
*H04L 12/801* (2013.01)
(Continued)

(52) U.S. Cl.
CPC ........ *H04L 47/2433* (2013.01); *H04L 45/745* (2013.01); *H04L 47/17* (2013.01); *H04L 47/2483* (2013.01); *H04L 63/101* (2013.01)

(58) Field of Classification Search
None
See application file for complete search history.

(56) References Cited

U.S. PATENT DOCUMENTS

| | | | |
|---|---|---|---|
| 2005/0055573 A1* | 3/2005 | Smith | H04L 45/54 726/4 |
| 2007/0223487 A1* | 9/2007 | Kajekar | H04L 45/00 370/395.2 |

(Continued)

FOREIGN PATENT DOCUMENTS

| | | |
|---|---|---|
| CN | 101272350 A | 9/2008 |
| CN | 102857428 A | 1/2013 |

(Continued)

OTHER PUBLICATIONS

Machine Translation and Abstract of Chinese Publication No. CN105847300, Aug. 10, 2016, 31 pages.
(Continued)

*Primary Examiner* — Scott M Sciacca
(74) *Attorney, Agent, or Firm* — Conley Rose, P.C.

(57) ABSTRACT

A method, includes receiving a packet flow optimization policy including a flow identifier of a target packet flow, a device identifier of a to-be-adjusted forwarding device, and information about the next hop; obtaining status information of an access control list (ACL) of the to-be-adjusted forwarding device based on the device identifier, where the status information includes resource usage status information of the ACL and capability information that indicates whether the to-be-adjusted forwarding device supports packet flow forwarding that is based on the ACL; and when determining, based on the status information, that the ACL includes an idle resource and the to-be-adjusted forwarding device supports packet flow forwarding that is based on the ACL, sending an ACL record to the to-be-adjusted forwarding device, where the ACL record includes the flow identifier and the information about the next hop.

20 Claims, 9 Drawing Sheets

(51) Int. Cl.
*H04L 12/701* (2013.01)
*H04L 12/851* (2013.01)
*H04L 29/06* (2006.01)

(56) References Cited

U.S. PATENT DOCUMENTS

2014/0032591 A1  1/2014  Li et al.
2017/0339048 A1*  11/2017  Thomas ............... H04L 61/103

FOREIGN PATENT DOCUMENTS

| CN | 103346971 | A | 10/2013 |
| CN | 104994065 | A | 10/2015 |
| CN | 105847153 | A | 8/2016 |
| CN | 105847300 | A | 8/2016 |

OTHER PUBLICATIONS

Foreign Communication From a Counterpart Application, European Application No. 17894204.1, Extended European Search Report dated Nov. 22, 2019, 7 pages.
Machine Translation and Abstract of Chinese Publication No. CN101272350, Sep. 24, 2008, 10 pages.
Machine Translation and Abstract of Chinese Publication No. CN102857428, Jan. 2, 2013, 15 pages.
Machine Translation and Abstract of Chinese Publication No. CN103346971, Oct. 9, 2013, 41 pages.
Machine Translation and Abstract of Chinese Publication No. CN104994065, Oct. 21, 2015, 15 pages.
Machine Translation and Abstract of Chinese Publication No. CN105847153, Aug. 10, 2016, 22 pages.
Foreign Communication From a Counterpart Application, PCT Application No. PCT/CN2017/110188, English Translation of International Search Report dated Jan. 29, 2018, 2 pages.
Foreign Communication From a Counterpart Application, PCT Application No. PCT/CN2017/110188, English Translation of Written Opinion dated Jan. 29, 2018, 3 pages.

* cited by examiner

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|    Type (Type)        |    Length (Length)    |
+-+-+-+-+-+-+-+-+-+-+-+-+-+-+-+-+-+-+-+-+-+-+-+-+
|              Capacity (Capacity)              |
+-+-+-+-+-+-+-+-+-+-+-+-+-+-+-+-+-+-+-+-+-+-+-+-+
|                 Speed (Speed)                 |
+-+-+-+-+-+-+-+-+-+-+-+-+-+-+-+-+-+-+-+-+-+-+-+-+
| Interface Type        |
| (Interface type)      |
+-+-+-+-+-+-+-+-+-+-+-+-+
```

FIG. 2F

FORWARDING PATH ADJUSTMENT METHOD, APPARATUS, AND SYSTEM

CROSS-REFERENCE TO RELATED APPLICATIONS

This application is a continuation application of International Application No. PCT/CN2017/110188, filed on Nov. 9, 2017, which claims priority to Chinese Patent Application No. 201710055193.4, filed on Jan. 24, 2017. The disclosures of the aforementioned applications are hereby incorporated by reference in their entireties.

TECHNICAL FIELD

This application relates to the communications field, and in particular, to a forwarding path adjustment method, apparatus, and system.

BACKGROUND

As communications networks develop, more packet flows are transmitted in the communications networks. To provide higher service quality to users, a communications network operator may sometimes adjust a forwarding path used to transmit packet flows of the users. For example, a packet flow of a gold user may be adjusted to a forwarding path with a relatively large bandwidth resource for transmission, to provide higher service quality to the gold user.

Currently, a forwarding path of a packet flow may be adjusted as follows: A technical person configures a packet flow optimization policy on an optimization controller, where the packet flow optimization policy includes a flow identifier of a to-be-adjusted target packet flow, a device identifier of a to-be-adjusted forwarding device, and information about an adjusted next hop corresponding to the to-be-adjusted forwarding device that is on a forwarding path, and the flow identifier of the target packet flow may include information such as a destination address and a source address of the target packet flow. The optimization controller sends an access control list (ACL) record to the to-be-adjusted forwarding device based on the device identifier, where the ACL record includes the flow identifier and the information about the next hop. The to-be-adjusted forwarding device receives the ACL record, and determines whether the to-be-adjusted forwarding device supports packet flow forwarding that is based on an ACL and whether an ACL of the to-be-adjusted forwarding device has a sufficient capacity for storing the ACL record; and if the to-be-adjusted forwarding device supports packet flow forwarding that is based on an ACL and the ACL of the to-be-adjusted forwarding device has sufficient space for storing the ACL record, stores the ACL record in the ACL of the to-be-adjusted forwarding device; otherwise, sends an error message to the optimization controller. The optimization controller receives the error message and sends routing information to the to-be-adjusted forwarding device, where the routing information includes the destination address of the target packet flow and the information about the next hop. The to-be-adjusted forwarding device receives the routing information and stores the routing information in a routing table of the to-be-adjusted forwarding device.

The ACL of the forwarding device sometimes has no sufficient capacity for storing the ACL record sent by the optimization controller, or the forwarding device does not support packet flow forwarding that is based on an ACL, resulting in that the ACL record cannot be stored in the ACL. However, the optimization controller still sends the ACL record to the forwarding device in this case, causing a resource waste.

SUMMARY

To reduce resource waste, embodiments of the present disclosure provides a forwarding path adjustment method, apparatus, and system. The technical solutions are as follows:

According to a first aspect, an embodiment of this application provides a forwarding path adjustment method. The method includes: receiving, by an optimization controller, a packet flow optimization policy, where the packet flow optimization policy includes a flow identifier of a to-be-adjusted target packet flow, a device identifier of a to-be-adjusted forwarding device, and information about an adjusted next hop corresponding to the to-be-adjusted forwarding device that is on a forwarding path of the target packet flow; obtaining status information of an access control list ACL of the to-be-adjusted forwarding device based on the device identifier, where the status information includes resource usage status information of the ACL and capability information, and the capability information is used to indicate whether the to-be-adjusted forwarding device supports packet flow forwarding that is based on the ACL; and when it is determined, based on the status information, that the ACL includes an idle resource and the to-be-adjusted forwarding device supports packet flow forwarding that is based on the ACL, sending an ACL record to the to-be-adjusted forwarding device, where the ACL record includes the flow identifier and the information about the next hop. In this way, only when it is determined that the ACL includes an idle resource and the to-be-adjusted forwarding device supports packet flow forwarding that is based on the ACL, the ACL record is sent to the to-be-adjusted forwarding device, and the ACL record is not sent in other cases. Compared with a current solution, a time used to try out the to-be-adjusted forwarding device is not required, and resource waste caused by sending the ACL record is reduced.

In a possible design of the first aspect, when the idle resource included in the ACL is less than or equal to a preset threshold, the optimization controller obtains a priority of the target packet flow; and when the priority reaches a specified priority, sends the ACL record to the to-be-adjusted forwarding device. In this way, when the ACL does not include many idle resources, it is ensured that a packet flow having a high priority is preferentially forwarded using the ACL, and higher service quality is provided for the packet flow having a high priority.

In a possible design of the first aspect, when the flow identifier is a destination address of the target packet flow, and after the sending, by the optimization controller, an ACL record to the to-be-adjusted forwarding device, the optimization controller controls the to-be-adjusted forwarding device to store routing information including the destination address and the information about the next hop in a routing table of the to-be-adjusted forwarding device, and to delete the ACL record from the ACL of the to-be-adjusted forwarding device. In this way, an ACL record corresponding to a packet flow that can be forwarded using the routing table may be deleted from the ACL of the to-be-adjusted forwarding device such that the ACL releases more idle resources, and another packet flow that cannot be forwarded using the routing table is forwarded using the ACL, thereby improving resource utilization.

In a possible design of the first aspect, when the flow identifier includes a destination address of the target packet flow, when it is determined, based on the status information, that the ACL has no idle resource or the to-be-adjusted forwarding device does not support packet flow forwarding that is based on the ACL, the optimization controller sends routing information to the to-be-adjusted forwarding device, where the routing information includes the destination address and the information about the next hop. In this way, when the ACL includes no idle resource or the to-be-adjusted forwarding device does not support packet flow forwarding that is based on the ACL, a forwarding path of the target packet flow may be adjusted using the routing table, to ensure that the forwarding path of the target packet flow can be successfully adjusted.

In a possible design of the first aspect, the flow identifier further includes a source address of the target packet flow, and after the sending, by the optimization controller, routing information to the to-be-adjusted forwarding device, when it is determined that the current ACL includes an idle resource and the to-be-adjusted forwarding device supports packet flow forwarding that is based on the ACL, the optimization controller controls the to-be-adjusted forwarding device to store the ACL record including the flow identifier and the information about the next hop in the ACL of the to-be-adjusted forwarding device, and to delete the routing information from the routing table of the to-be-adjusted forwarding device. Because the flow identifier includes the source address of the target packet flow and the target packet flow cannot be forwarded based on the source address using the routing table, the ACL record including the flow identifier and the information about the next hop is stored in the ACL, to ensure that this type of packet flow can be successfully forwarded.

In a possible design of the first aspect, the optimization controller obtains the status information of the ACL of the to-be-adjusted forwarding device based on the device identifier and a correspondence, stored by the optimization controller, between a device identifier and status information of an ACL. Because the device identifier and the status information of the ACL are correspondingly stored in advance, when the status information of the ACL is required, the status information of the ACL is directly and quickly obtained based on the device identifier of the to-be-adjusted forwarding device and the correspondence, thereby improving obtaining efficiency.

In a possible design of the first aspect, before the obtaining the status information of the ACL, the optimization controller further receives a packet sent by the to-be-adjusted forwarding device; obtains the device identifier of the to-be-adjusted forwarding device and the status information of the ACL of the to-be-adjusted forwarding device based on the packet; and correspondingly stores the device identifier of the to-be-adjusted forwarding device and the status information of the ACL of the to-be-adjusted forwarding device in the correspondence between a device identifier and status information of an ACL. The status information of the ACL of the forwarding device may be obtained using the packet and is stored locally. In this way, it is ensured that when the forwarding path of the packet flow is adjusted, the status information of the ACL of the to-be-adjusted device can be obtained in time.

In a possible design of the first aspect, the packet includes the device identifier of the to-be-adjusted forwarding device and usage status information of a forwarding chip; and the optimization controller extracts the device identifier of the to-be-adjusted forwarding device and the usage status information of the forwarding chip of the to-be-adjusted forwarding device that are included in the packet; and obtains the status information of the ACL of the to-be-adjusted forwarding device based on the usage status information of the forwarding chip. In this way, the packet carries the usage status information of the forwarding chip of the to-be-adjusted forwarding device such that the status information of the ACL of the to-be-adjusted forwarding device can be successfully obtained based on the usage status information of the forwarding chip.

According to a second aspect, an embodiment of this application provides a forwarding path adjustment method. The method includes: obtaining, by a to-be-adjusted forwarding device, usage status information of a forwarding chip or status information of an access control list ACL; generating a packet, where the packet carries the usage status information of the forwarding chip or the status information of the ACL; and sending the packet to an optimization controller. In this way, the optimization controller can obtain the status information of the ACL of the to-be-adjusted forwarding device using the usage status information of the forwarding chip or the status information of the ACL such that the optimization controller adjusts a forwarding path of a packet flow transmitted by the to-be-adjusted forwarding device.

In a possible design of the second aspect, the packet includes a type length value (TLV) field, the TLV field includes a type T field, a length L field, and a value V field, and the V field carries the usage status information of the forwarding chip or the status information of the ACL.

In a possible design of the second aspect, the usage status information of the forwarding chip includes a total storage space capacity and usage status information of logical tables included in the forwarding chip of the to-be-adjusted forwarding device, and the logical tables stored by the forwarding chip include at least one of an ACL, a quality of service (QoS) table, an local packet transport service (LPTS) table, and an IP Flow information export (IPFIX) table. Correspondingly, the packet includes a first TLV field and a second TLV field that corresponds to each of the logical tables, the first TLV field is used to carry the total storage space capacity, and the second TLV field is used to carry usage status information of the logical table corresponding to the second TLV field. In this way, it is ensured that the to-be-adjusted forwarding device can successfully send the usage status information of the forwarding chip of the to-be-adjusted forwarding device.

In a possible design of the second aspect, after sending the packet to the optimization controller, the to-be-adjusted forwarding device receives an ACL record sent by the optimization controller, where the ACL record includes a flow identifier of a to-be-adjusted target packet flow and information about an adjusted next hop corresponding to the to-be-adjusted forwarding device that is on a forwarding path of the target packet flow; and stores the ACL record in the ACL of the to-be-adjusted forwarding device.

In a possible design of the second aspect, the flow identifier is a destination address of the target packet flow, and after storing the ACL record in the ACL of the to-be-adjusted forwarding device, the to-be-adjusted forwarding device further stores routing information including the destination address and the information about the next hop in a routing table of the to-be-adjusted forwarding device, and deletes the ACL record from the ACL. In this way, an ACL record corresponding to a packet flow that can be forwarded using the routing table may be deleted from the ACL of the to-be-adjusted forwarding device such that the ACL releases more idle resources, and another packet flow that cannot be forwarded using the routing table is forwarded using the ACL, thereby improving resource utilization.

In a possible design of the second aspect, after sending the packet to the optimization controller, the to-be-adjusted forwarding device receives routing information sent by the optimization controller, where the routing information includes a destination address of a to-be-adjusted target packet flow and information about an adjusted next hop corresponding to the to-be-adjusted forwarding device that is on a forwarding path of the target packet flow; and stores the routing information in the routing table of the to-be-adjusted forwarding device. In this way, when the ACL includes no idle resource or the to-be-adjusted forwarding device does not support packet flow forwarding that is based on the ACL, a forwarding path of the target packet flow may be adjusted using the routing table, to ensure that the forwarding path of the target packet flow can be successfully adjusted.

In a possible design of the second aspect, the flow identifier of the target packet flow includes a source address of the target packet flow, and after storing the routing information in the routing table of the to-be-adjusted forwarding device, the to-be-adjusted forwarding device further receives an ACL record sent by the optimization controller, where the ACL record includes the flow identifier and the information about the next hop; stores the ACL record in the ACL of the to-be-adjusted forwarding device; and deletes the routing information from the routing table. Because the flow identifier includes the source address of the target packet flow and the target packet flow cannot be forwarded based on the source address using the routing table, the ACL record including the flow identifier and the information about the next hop is stored in the ACL, to ensure that this type of packet flow can be successfully forwarded.

According to a third aspect, an embodiment of this application provides a forwarding path adjustment apparatus that performs the method according to the first aspect or any possible design of the first aspect. Further, the apparatus includes units configured to perform the method according to the first aspect or any possible design of the first aspect.

According to a fourth aspect, an embodiment of this application provides a forwarding path adjustment apparatus configured to perform the method according to the second aspect or any possible design of the second aspect. Further, the apparatus includes units configured to perform the method according to the second aspect or any possible design of the second aspect.

According to a fifth aspect, an embodiment of this application provides a forwarding path adjustment apparatus. The apparatus includes an input interface, an output interface, a processor, and a memory. The input interface, the output interface, the processor, and the memory may be connected using a bus system. The memory is configured to store a program, an instruction, or code, and the processor is configured to execute the program, the instruction, or the code in the memory, to perform the method according to the first aspect or any possible design of the first aspect.

According to a sixth aspect, an embodiment of this application provides a forwarding path adjustment apparatus. The apparatus includes an input interface, an output interface, a processor, and a memory. The input interface, the output interface, the processor, and the memory may be connected using a bus system. The memory is configured to store a program, an instruction, or code, and the processor is configured to execute the program, the instruction, or the code in the memory, to perform the method according to the second aspect or any possible design of the second aspect.

According to a seventh aspect, an embodiment of this application provides a forwarding path adjustment system. The system includes the apparatus according to the third aspect or the fifth aspect and the apparatus according to the fourth aspect or the sixth aspect.

According to an eighth aspect, an embodiment of this application provides a computer-readable storage medium configured to store a computer program. The computer program is used to execute an instruction of the method according to the first aspect, the second aspect, any possible design of the first aspect, or any possible design of the second aspect.

BRIEF DESCRIPTION OF DRAWINGS

FIG. 2F is a schematic structural diagram of another TLV according to Embodiment 2 of the present disclosure;

DESCRIPTION OF EMBODIMENTS

To make the objectives, technical solutions, and advantages of the present disclosure clearer, the following further describes the implementations of the present disclosure in detail with reference to the accompanying drawings.

A communications network may be used to transmit a packet flow of a user. Sometimes, to provide higher service quality to a user or reduce service quality of a low-priority user to ensure service quality of a high-priority user, a forwarding path of a packet flow of a user may be adjusted, that is, the packet flow of the user is switched from the current forwarding path to another forwarding path. Service quality provided by the another forwarding path is higher than or lower than that of the current forwarding path. For example, for a paid user, a gold user, or a member user, packet flows of the users may be adjusted from a current forwarding path to another forwarding path having more bandwidth resources than that of the current forwarding path. A detailed process of forwarding path adjustment may be implemented in the following embodiments.

Embodiment 1

Figure 1:
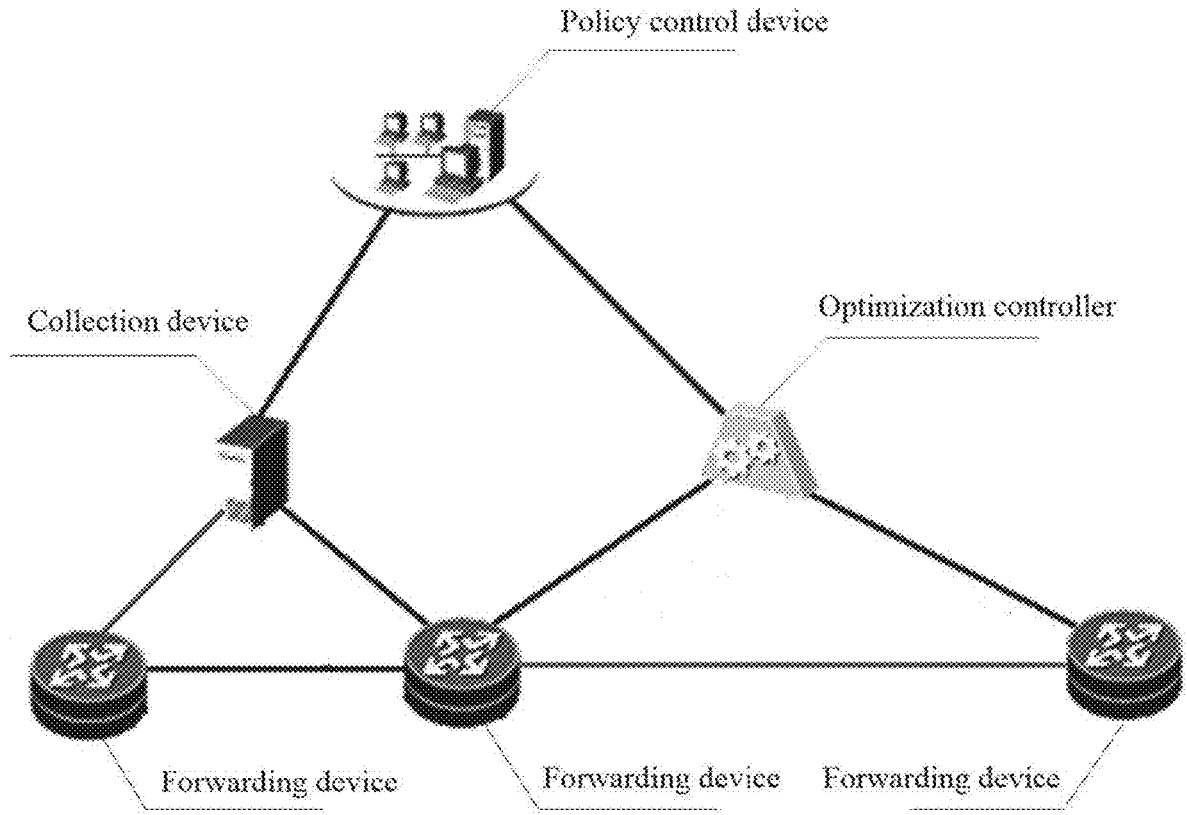
FIG. 1 is a schematic diagram of a network architecture according to Embodiment 1 of the present disclosure.

Referring to FIG. 1, this embodiment of the present disclosure provides a network architecture. The network architecture is used to adjust a forwarding path of a packet flow and includes: a collection device, a policy control device, an optimization controller, and a forwarding device.

The forwarding device may be a router, a forwarder, a switch, or the like. The forwarding device includes a forwarding chip. The forwarding chip may be configured to store at least one of logical tables such as an ACL, a QoS table, a LPTS table, and an IPFIX table. The forwarding device may separately establish a network connection to the collection device and the optimization controller, and is configured to: when the forwarding device is powered on or content stored in the forwarding chip of the forwarding device changes, send a packet to the optimization controller such that the optimization controller obtains status information of an ACL of the forwarding device based on the packet. The forwarding device is further configured to: when receiving a packet flow, forward the packet flow based on stored information about a next hop of the packet flow, copy the packet flow, and send the copied packet flow to the collection device.

The collection device may further establish a network connection to the policy control device, and is configured to receive a packet flow sent by each forwarding device and obtain description information of each received packet flow. The description information of the packet flow includes information about the packet flow such as a source address, a source port number, a destination address, a destination port number, a used protocol, an occupied bandwidth, and a forwarding path for forwarding the packet flow. The collection device sends the description information of each packet flow to the policy control device.

The policy control device may further establish a network connection to the optimization controller, and is configured to: receive the description information of each packet flow that is sent by the collection device, display the description information of each packet flow in a topological structural diagram of the communications network, and obtain a packet flow optimization policy configured by a manager based on the description information of each packet flow. The packet flow optimization policy includes a flow identifier of a to-be-adjusted target packet flow, a device identifier of a to-be-adjusted forwarding device, and information about an adjusted next hop corresponding to the to-be-adjusted forwarding device that is on a forwarding path of the target packet flow, and the flow identifier includes at least one of a source address and a destination address of the target packet flow. The policy control device sends the packet flow optimization policy to the optimization controller.

The optimization controller is configured to: receive a packet sent by the forwarding device and obtain the status information of the ACL of the forwarding device based on the packet; and receive the packet flow optimization policy sent by the policy control device, obtain status information of an ACL of the to-be-adjusted forwarding device, and adjust a forwarding path of the target packet flow based on the status information and the packet flow optimization policy.

The optimization controller may be a network controller (NC).

In the network architecture of this embodiment, if a forwarding path of a packet flow needs to be adjusted, the optimization controller needs to first locally store status information of an ACL of each forwarding device, and when adjusting a forwarding path of a packet flow on a forwarding device, adjust the forwarding path of the packet flow based on stored status information of an ACL of the forwarding device. Next, status information of an ACL of a forwarding device is stored using a procedure in the following Embodiment 2, and a forwarding path of a packet flow is adjusted using a procedure of the following Embodiment 3.

Embodiment 2

Figure 2A:
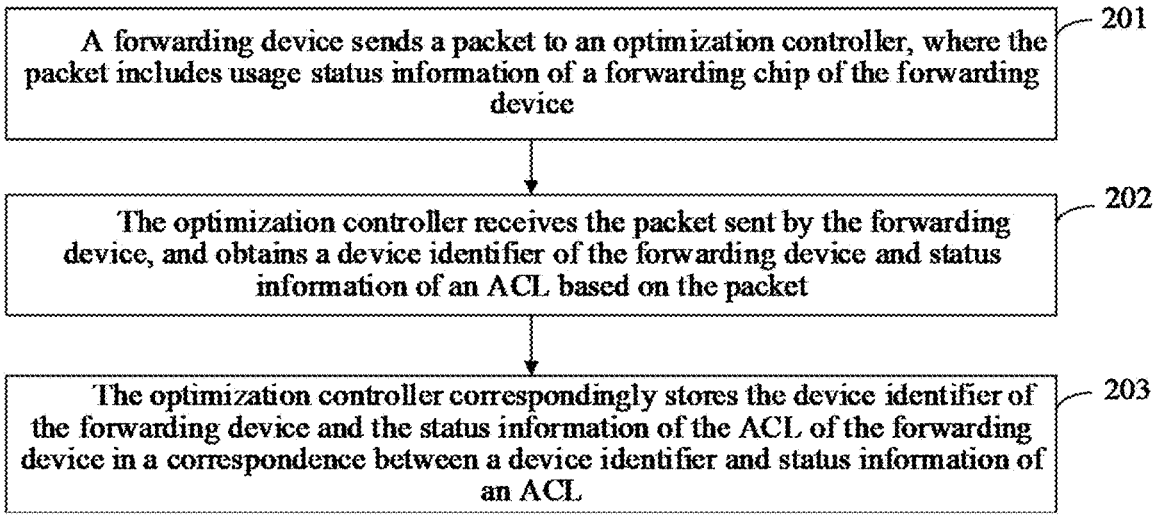
FIG. 2A is a flowchart of storing status information of an ACL according to Embodiment 2 of the present disclosure.

FIG. 2A shows a procedure of storing status information of an ACL according to this embodiment of the present disclosure. The procedure includes:

Step 201: A forwarding device sends a packet to an optimization controller.

The packet may include a device identifier of the forwarding device and status information of an ACL, or the packet may include a device identifier of the forwarding device and usage status information of a forwarding chip.

The forwarding device may be any forwarding device in a communications network, and the forwarding device includes a forwarding chip. The usage status information of the forwarding chip is used to indicate status information of an ACL in the forwarding chip, the status information includes resource usage status information of the ACL and capability information, and the capability information is used to indicate whether the forwarding device supports packet flow forwarding that is based on the ACL. The resource usage status information may be an idle resource size or an available resource size of the ACL or the like. The idle resource size may be a quantity of free entries in the ACL or the like.

Storage space of the forwarding chip includes at least one of logical tables such as an ACL, a QoS table, an LPTS table, and an IPFIX table. When the storage space of the forwarding chip includes one logical table, an ACL, the packet may include status information of the ACL.

The usage status information of the forwarding chip may include a total storage space capacity and usage status information of the logical tables of the forwarding chip. The usage status information of the logical tables may be usage status information of the ACL, usage status information of the QoS table, usage status information of the LPTS table, and usage status information of the IPFIX table. It should be noted that when the forwarding device supports packet flow forwarding that is based on the ACL, the usage status information of the forwarding chip includes the usage status information of the ACL, and when the forwarding device does not support packet flow forwarding that is based on the ACL, the usage status information of the forwarding chip does not include the usage status information of the ACL.

The usage status information of the ACL includes a quantity of entries already used in the ACL, a quantity of entries not used in the ACL, a quantity of entries reserved in the ACL, and entry sizes. The usage status information of the QoS table includes a quantity of entries already used in the QoS table, a quantity of entries not used in the QoS table, a quantity of entries reserved in the QoS table, and entry sizes. The usage status information of the LPTS table includes a quantity of entries already used in the LPTS table, a quantity of entries not used in the LPTS table, a quantity of entries reserved in the LPTS table, and entry sizes. The usage status information of the IPFIX table includes a quantity of entries already used in the IPFIX table, a quantity of entries not used in the IPFIX table, a quantity of entries reserved in the IPFIX table, and entry sizes.

A reserved entry is an entry that cannot be used. For example, an entry reserved in the ACL is an entry that cannot be used in the ACL.

When the forwarding device is powered on or content stored in the forwarding chip of the forwarding device changes, the forwarding device sends a packet including the device identifier of the forwarding device and the status information of the ACL of the forwarding device or a packet including the device identifier of the forwarding device and the usage status information of the forwarding chip to the optimization controller.

The packet may be a border gateway protocol-label switching (BGP-LS) packet, a BGP monitoring protocol (BMP) packet, or an internal gateway protocol (IGP) packet. In this embodiment, a TLV field is added to the protocol packets, the TLV field carries the status information of the ACL of the forwarding device or the usage status information of the forwarding chip of the forwarding device. A source address field of the protocol packet carries the device identifier of the forwarding device.

The TLV field includes a T field, an L field, and a V field, and the V field carries the status information of the ACL of the forwarding device or the usage status information of the forwarding chip of the forwarding device.

For example, in this embodiment, two packets: an OSPF packet and an ISIS packet, are defined.

Figure 2B:
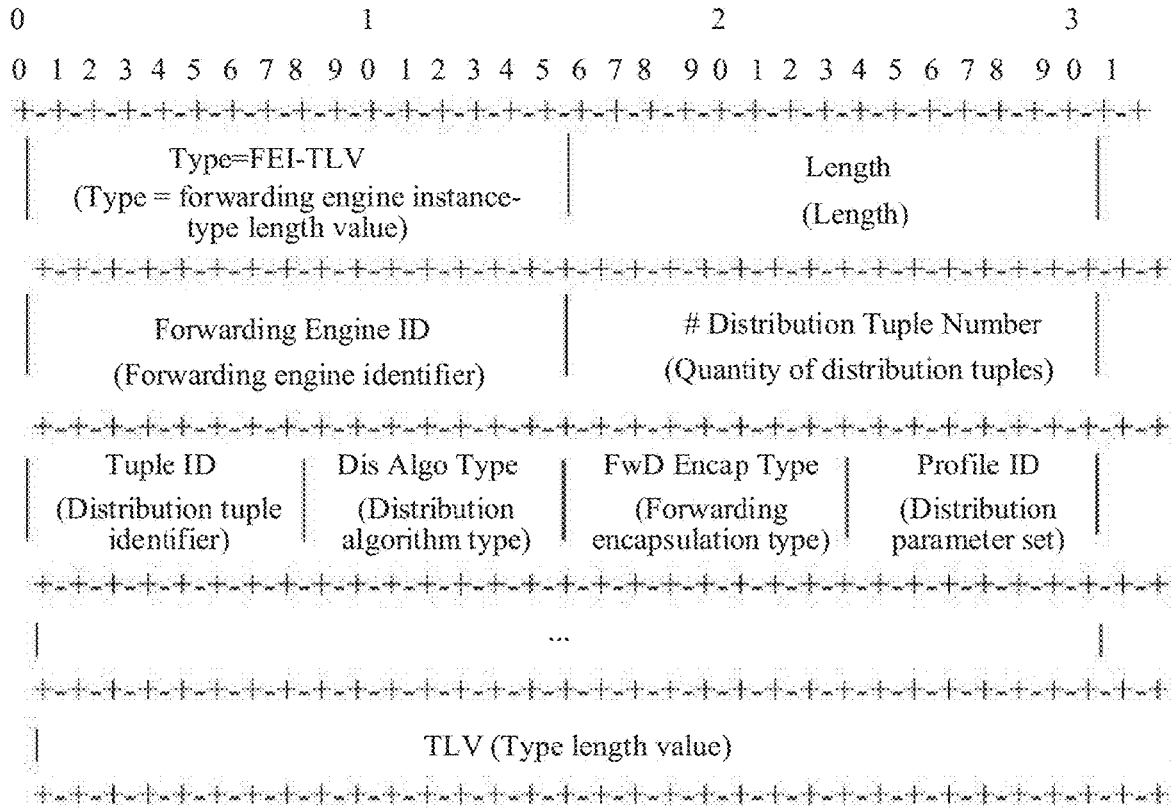
FIG. 2B is a schematic structural diagram of an open shortest path first (OSPF) packet according to Embodiment 2 of the present disclosure.

Refer to a structure of the OSPF packet shown in FIG. 2B. In the structure in FIG. 2B, Type indicates a packet type field, and when Type=forwarding engine instance-type length value (FEI-TLV), it indicates that the packet is an OSPF packet. Length indicates a length field used to carry a length of other parts than Type and Length in the packet. The TLV field is used to carry the status information of the ACL of the forwarding device or is used to carry the usage status information of the forwarding chip of the forwarding device. A Forwarding Engine ID field is used to indicate a forwarding engine. The ID is unique within each router/device range. Distribution Tuple Number indicates a quantity of distribution tuples. A distribution tuple is a combination of Dist Algo Type, Encap Type, and Profile ID, and is uniquely identified by Tuple ID. Tuple ID uniquely identifies a distribution tuple. The identifier is unique within a Forwarding Engine ID range. The Dist Algo Type field indicates a distribution algorithm type supported by the forwarding engine. Fwd Encap Type is used to indicate a forwarding encapsulation type. Profile ID is used to indicate a predefined common distribution parameter set.

The OSPF packet may include at least one TLV field, and when the OSPF packet includes the status information of the ACL of the forwarding device, the OSPF packet may include a TLV field used to carry the status information of the ACL of the forwarding device.

When the OSPF packet includes the usage status information of the forwarding chip of the forwarding device, the OSPF packet may include a first TLV and at least one second TLV, where the first TLV may be used to carry a total storage space capacity of the forwarding chip of the forwarding device. Each of the at least one second TLV corresponds to a logical table in the forwarding chip, and is used to carry usage status information of the logical table corresponding to the second TLV.

Figure 2C:
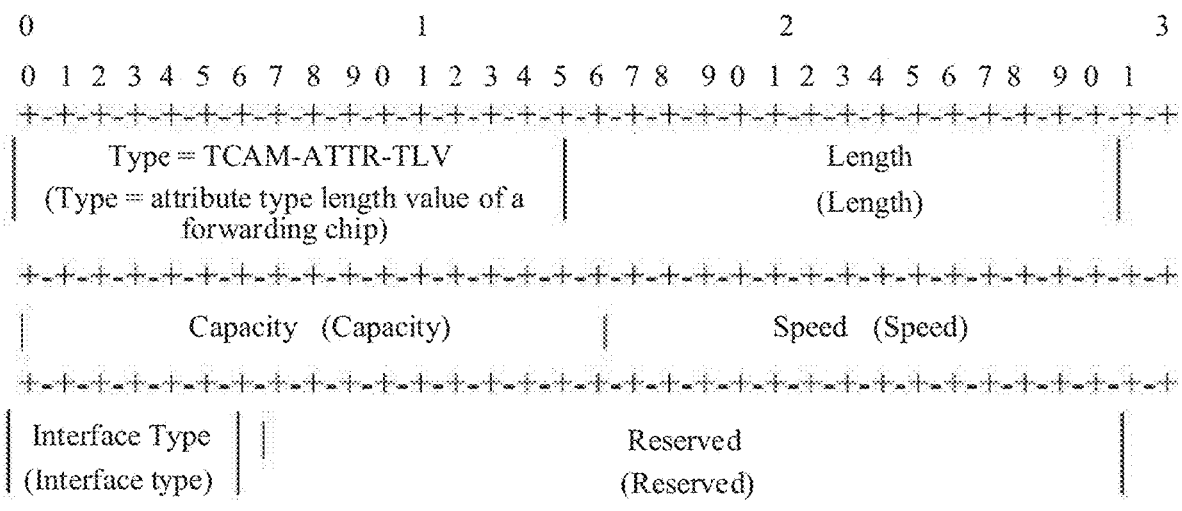
FIG. 2C is a schematic structural diagram of a TLV according to Embodiment 2 of the present disclosure.

Refer to a structure of the first TLV field used to carry the total storage space capacity shown in FIG. 2C. In the structure shown in FIG. 2C, Type indicates a type field and the value of Type is an attribute type length value (TCAM-ATTR-TLV) of the forwarding chip, and it indicates that the first TLV carries the total storage space capacity. Capacity indicates a capacity field and is used to carry the total storage space capacity of the forwarding chip in a unit of M-bit. Speed indicates a speed field used to carry a maximum search speed of the forwarding chip in a unit of million searches per second. Interface Type indicates an interface type field used to carry an interface type of the forwarding chip. Interface types are as follows: network search engine (NSE), line amplifier (LA-1), application-specific integrated circuit (ASIC), field programmable gate array (FPGA), and applied micro circuit corporation external search co-processor (AMCC-XSC).

Figure 2D:
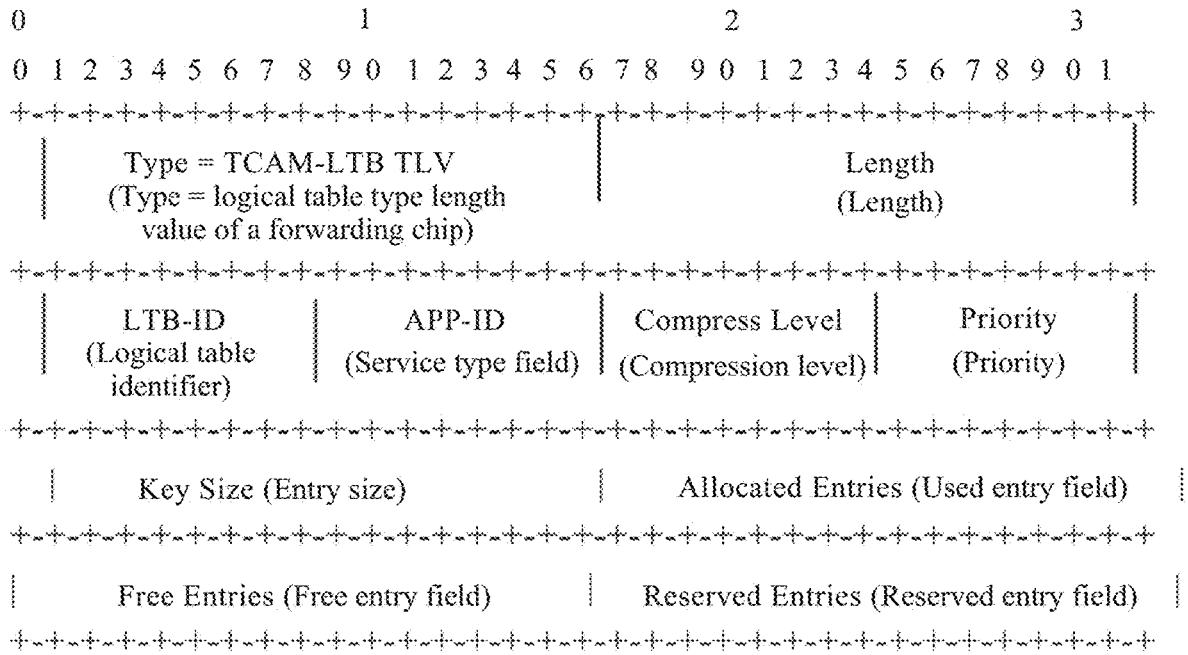
FIG. 2D is a schematic structural diagram of another TLV according to Embodiment 2 of the present disclosure.

Refer to a structure of the second TLV field shown in FIG. 2D. In the structure shown in FIG. 2D, LTB-ID indicates an identifier field used to carry a logical table identifier in the forwarding chip. The logical table identifier ID may be an integer. For example, a value 1 may be used as an identifier of an ACL and a value 2 may be used as an identifier of a QoS table.

APP-ID indicates a service type field used to carry a name of the logical table in the forwarding chip, and indicates that the second TLV is used to carry usage status information of the logical table corresponding to the name. The logical table includes four types: an ACL, a QoS table, an LPTS table, and an IPFIX table. For example, when a value of the field is 1, it may indicate that usage status information of an ACL is carried; when the value is 2, it may indicate that usage status information of a QoS table is carried; when the value is 3, it indicates that usage status information of an LPTS table is carried; and when the value is 4, it indicates that usage status information of an IPFIX table is carried.

Compression Level indicates a compression level field that is used to carry a compression level used for data of the logical table carried in the service type field. For example, when a value of the field is 0, it indicates that a carried compression level is level-0; when a value of the field is 1, it indicates that a compression level is level-1; when a value of the field is 2, it indicates that a compression level is level-2; and when a value of the field is 3, it indicates that a compression level is level-3.

Priority indicates a priority field used to carry a priority of the logical table, and may be an integer. For example, a large value may indicate a high priority or a small value may indicate a high priority.

Key Size indicates an entry size field used to carry a size of each entry in the logical table. For example, when a value of the field is 160, it indicates that an entry size is 160 bits, and when a value of the field is 640, it indicates that an entry size is 640 bits.

Allocated Entries indicates a used entry field used to carry a quantity of entries that has been used in the logical table.

Free Entries indicates a free entry field used to carry a quantity of entries that has not been used in the logical table.

Reserved Entries indicates a reserved entry field used to carry a quantity of entries reserved in the logical table.

Figure 2E:
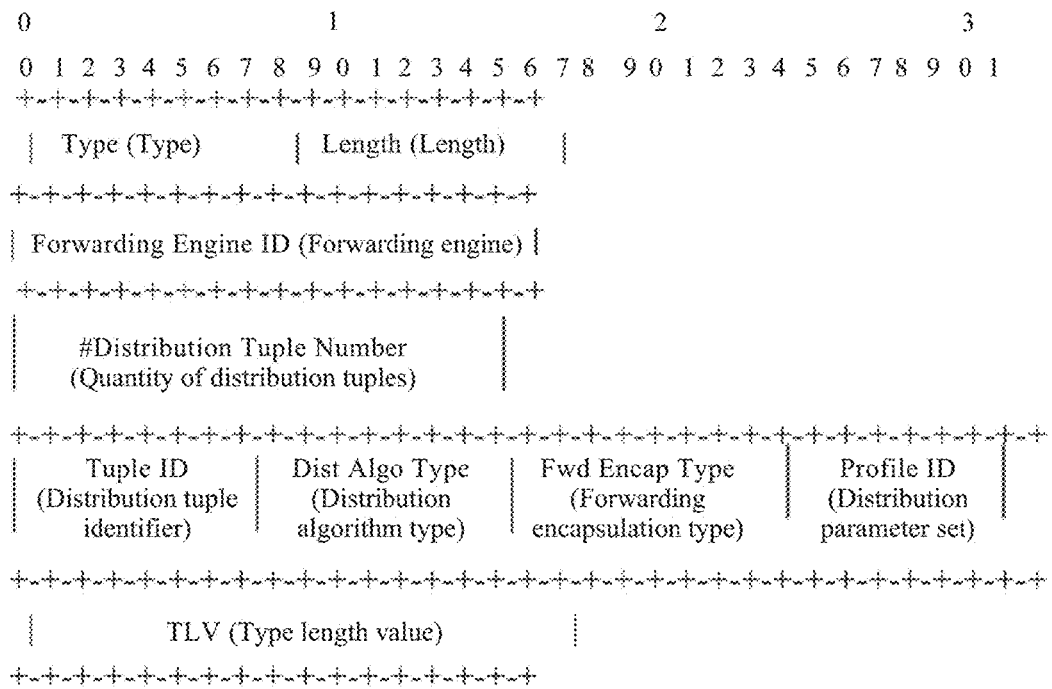
FIG. 2E is a schematic structural diagram of an intermediate system to intermediate system (ISIS) packet according to Embodiment 2 of the present disclosure.

FIG. 2E shows a structure of the ISIS packet. In the structure shown in FIG. 2E, Type indicates a type field and indicates that the packet is an ISIS packet. Length indicates a length field used to carry a packet length. The TLV field is used to carry the status information of the ACL of the forwarding device or is used to carry the usage status information of the forwarding chip of the forwarding device. A Forwarding Engine ID field is used to indicate a forwarding engine. The ID is unique within each router/device. Distribution Tuple Number indicates a quantity of distribution tuples. A distribution tuple is a combination of Dist Algo Type, Encap Type, and Profile ID, and is uniquely identified by Tuple ID. Tuple ID uniquely identifies a distribution tuple. The identifier is unique within one Forwarding Engine ID. The Dist Algo Type field indicates a distribution algorithm type supported by the forwarding engine. Fwd Encap Type is used to indicate a forwarding encapsulation type. Profile ID is used to indicate a predefined common distribution parameter set.

The ISIS packet may include at least one TLV field, and when the ISIS packet includes the status information of the ACL of the forwarding device, the ISIS packet may include a TLV field used to carry the status information of the ACL of the forwarding device.

When the ISIS packet includes the usage status information of the forwarding chip of the forwarding device, the ISIS packet may include a first TLV and at least one second TLV, where the first TLV may be used to carry a total storage space capacity of the forwarding chip of the forwarding device. Each of the at least one second TLV corresponds to a logical table in the forwarding chip, and is used to carry usage status information of the logical table corresponding to the second TLV.

Refer to a structure of the first TLV field used to carry the total storage space capacity shown in FIG. 2F. In the structure shown in FIG. 2F, Type indicates a type field, and Length indicates a length field used to carry a field length. Capacity indicates a capacity field used to carry the total storage space capacity of the forwarding chip in a unit of M-bit. Speed indicates a speed field used to carry a maximum search speed of the forwarding chip in a unit of million searches per second. Interface Type indicates an interface type field used to carry an interface type of the forwarding chip. Interface types are as follows: NSE, LA-A, ASIC, FPGA, and AMCC-XSC.

Figure 2G:
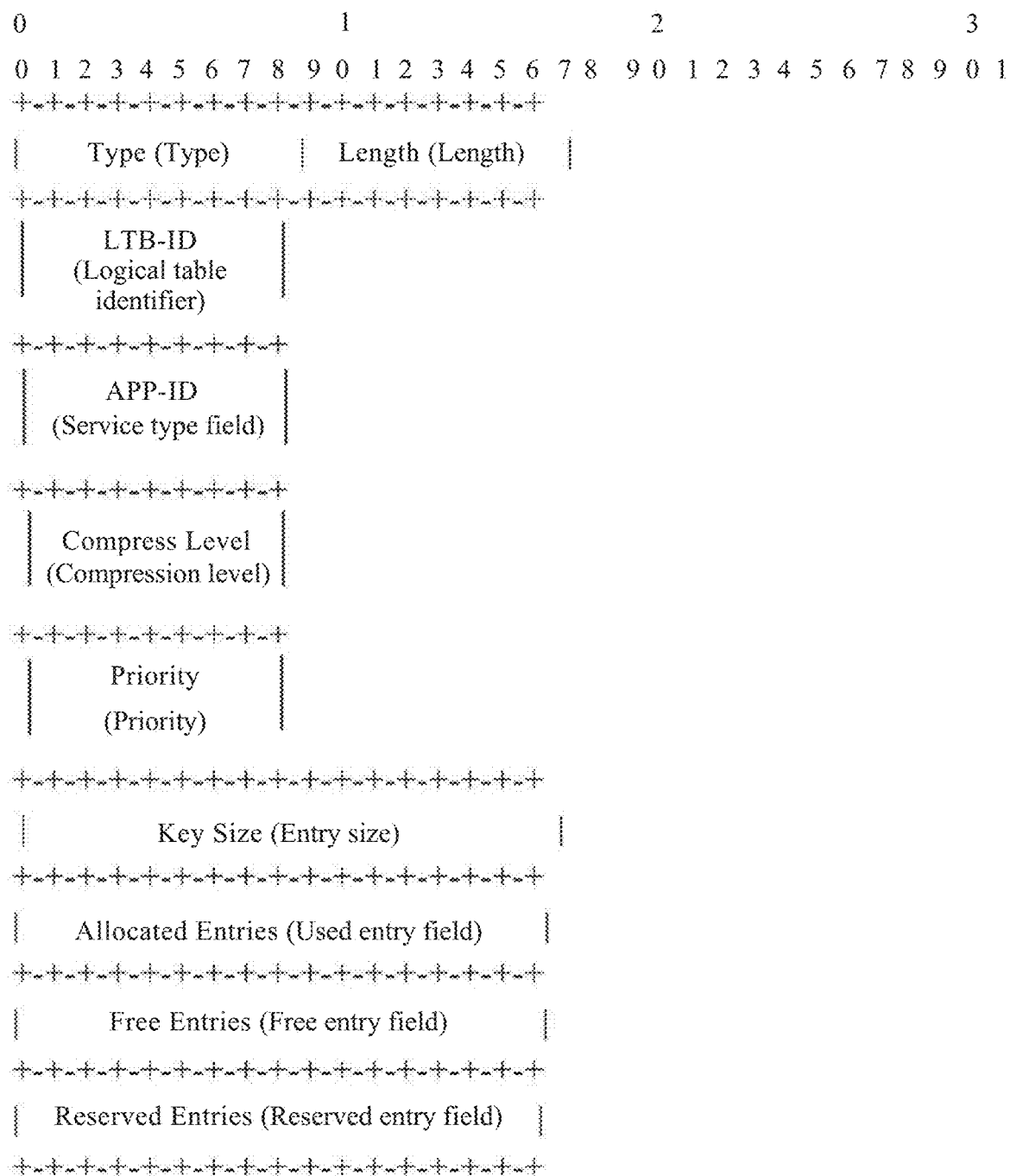
FIG. 2G is a schematic structural diagram of another TLV according to Embodiment 2 of the present disclosure.

Refer to a second TLV shown in FIG. 2G. In the structure shown in FIG. 2G, Type indicates a type field and Length indicates a length field. LTB-ID indicates an identifier field used to carry a logical table identifier (Logical Table Identifier) in the forwarding chip, where the logical table identifier ID may be an integer. For example, a value 1 may be used as an identifier of an ACL, and a value 2 may be used as an identifier of a QoS table.

APP-ID indicates a service type field used to carry a name of the logical table in the forwarding chip, and indicates that the second TLV is used to carry usage status information of the logical table corresponding to the name. The logical table includes an ACL, a QoS table, an LPTS table, and an IPFIX table. For example, when a value of the field is 1, it may indicate that usage status information of an ACL is carried; when the value is 2, it may indicate that usage status information of a QoS table is carried; when the value is 3, it indicates that usage status information of an LPTS table is carried; and when the value is 4, it indicates that usage status information of an IPFIX table is carried.

Compression Level indicates a compression level field that is used to carry a compression level used for data of the logical table carried in the service type field. For example, when a value of the field is 0, it indicates that a carried compression level is level-0; when a value of the field is 1, it indicates that a compression level is level-1; when a value of the field is 2, it indicates that a compression level is level-2; and when a value of the field is 3, it indicates that a compression level is level-3.

Priority indicates a priority field used to carry a priority of the logical table, and may be an integer. For example, it may be defined in such a manner that a large value indicates a high priority or a small value indicates a high priority.

Key Size indicates an entry size field used to carry a size of each entry in the logical table. For example, when a value of the field is 160, it indicates that an entry size is 160 bits, and when a value of the field is 640, it indicates that an entry size is 640 bits.

Allocated Entries indicates a used entry field used to carry a quantity of entries that has been used in the logical table.

Free Entries indicates a free entry field used to carry a quantity of entries that has not been used in the logical table.

Reserved Entries indicates a reserved entry field used to carry a quantity of entries reserved in the logical table.

Step 202: The optimization controller receives the packet sent by the forwarding device, and obtains a device identifier of the forwarding device and status information of an ACL based on the packet.

When the packet includes the device identifier of the forwarding device and the status information of the ACL of the forwarding device, the device identifier of the forwarding device and the status information of the ACL of the forwarding device are extracted from the packet.

When the packet includes the device identifier of the forwarding device and the usage status information of the forwarding chip, the device identifier of the forwarding device and the usage status information of the forwarding chip included in the packet are extracted, and the status information of the ACL of the forwarding device is obtained based on the usage status information of the forwarding chip.

The status information of the ACL is obtained based on the usage status information of the forwarding chip in a plurality of manners. For example, assuming that the usage status information of the forwarding chip includes only usage status information of the ACL, the status information of the ACL is determined based on a quantity of entries not used and a quantity of reserved entries that are included in the usage status information of the ACL. For another example, assuming that the usage status information of the forwarding chip includes usage status information of logical tables such as an ACL, a QoS table, an LPTS table, and an IPFIX table, the status information of the ACL may be obtained using the following steps 2021 to 2027:

Step 2021: Determine whether the usage status information of the forwarding chip includes the usage status information of the ACL, and if the usage status information of the forwarding chip includes the usage status information of the ACL, determine that capability information of the ACL is used to indicate that the forwarding device supports packet flow forwarding that is based on the ACL, and perform step 2022.

If it is determined that the usage status information of the forwarding chip does not include the usage status information of the ACL, it is determined that the capability information of the ACL is used to indicate that the forwarding device does not support packet flow forwarding that is based on the ACL, and the procedure ends.

Step 2022: Determine a space size occupied by the ACL based on a quantity of entries already used in the ACL, a quantity of entries reserved in the ACL, and entry sizes that are included in the usage status information of the forwarding chip.

Step 2023: Determine a space size occupied by the QoS table based on a quantity of entries already used in the QoS table, a quantity of entries reserved in the QoS table, and entry sizes that are included in the usage status information of the forwarding chip.

Step 2024: Determine a space size occupied by the LPTS table based on a quantity of entries already used in the LPTS table, a quantity of entries reserved in the LPTS table, and entry sizes that are included in the usage status information of the forwarding chip.

Step 2025: Determine a space size occupied by the IPFIX table based on a quantity of entries already used in the IPFIX table, a quantity of entries reserved in the IPFIX table, and entry sizes that are included in the usage status information of the forwarding chip.

Step 2026: Determine an idle storage space size of the forwarding chip based on the space size occupied by the ACL, the space size occupied by the QoS table, the space size occupied by the LPTS table, the space size occupied by the IPFIX table, and the total storage space capacity of the forwarding chip that is included in the usage status information of the forwarding chip.

Step 2027: Determine resource usage status information of the ACL based on the idle storage space size, and a quantity of entries not used in the ACL and entry sizes that are included in the usage status information of the forwarding chip.

Further, a quantity of entries is calculated based on the idle storage space size and the entry sizes of the ACL, and if the calculated quantity of entries is less than the quantity of entries not used in the ACL, it is determined that the resource usage status information of the ACL includes the calculated quantity of entries, or if the calculated quantity of entries is greater than or equal to the quantity of entries not used in the ACL, it is determined that the resource usage status information of the ACL includes the quantity of entries not used in the ACL.

Step 203: The optimization controller correspondingly stores the device identifier of the forwarding device and the status information of the ACL of the forwarding device in a correspondence between a device identifier and status information of an ACL.

The optimization controller includes a mapping relationship table, and the mapping relationship table is used to store the correspondence between a device identifier and status information of an ACL.

The optimization controller may obtain status information of an ACL of each forwarding device in the manner of 201 to 203.

Embodiment 3

Figure 3A:
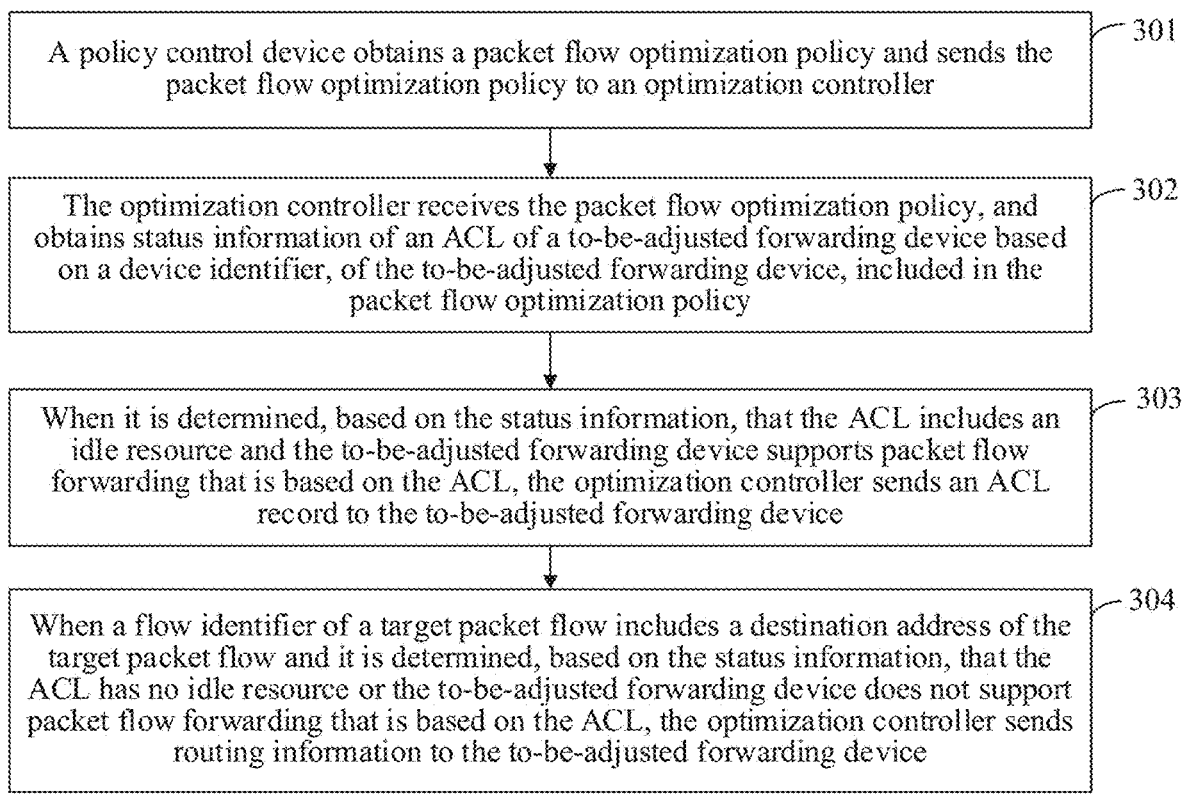
FIG. 3A is a flowchart of a forwarding path adjustment method according to Embodiment 3 of the present disclosure.

Referring to FIG. 3A, an embodiment of the present disclosure provides a forwarding path adjustment method. The method includes:

Step 301: A policy control device obtains a packet flow optimization policy and sends the packet flow optimization policy to an optimization controller.

The packet flow optimization policy obtained by the policy control device may be configured by a manager. The policy control device may first obtain description information of a packet flow in a communications network and display the description information to the manager. Then, the manager configures the packet flow optimization policy based on the displayed description information of the packet flow, where the packet flow optimization policy includes a flow identifier of a to-be-adjusted target packet flow, a device identifier of a to-be-adjusted forwarding device, and information about an adjusted next hop corresponding to the to-be-adjusted forwarding device on a forwarding path for transmission of the target packet flow. The to-be-adjusted forwarding device is a forwarding device that the target packet flow passes through.

Optionally, the policy control device obtains the description information of the packet flow using a collection device and displays the description information to the manager. The following describes a process of obtaining and displaying the description information using an example, and the following steps 3011 to 3013 may be included:

Step 3011: A forwarding device sends a packet flow received by the forwarding device to a collection device.

The forwarding device may send the packet flow received by the forwarding device to the collection device in the following two cases, including:

In a first case, the forwarding device sends the packet flow received by the forwarding device to the collection device when receiving the packet flow.

When receiving the packet flow, the forwarding device copies the packet flow received by the forwarding device, and sends the copied packet flow to the collection device.

In a second case, when receiving a collection command sent by the collection device, the forwarding device sends the packet flow received by the forwarding device to the collection device.

The collection device periodically broadcasts a collection command to each forwarding device in a communications network. When receiving the collection command, the forwarding device copies each packet flow currently received by the forwarding device, and sends each copied packet flow to the collection device.

Step 3012: The collection device receives a packet flow sent by each forwarding device, obtains description information of each received packet flow, and sends the description information of each packet flow to the policy control device.

The description information of the packet flow includes information about the packet flow such as a source address, a source port number, a destination address, a destination port number, a used protocol, an occupied bandwidth, and a forwarding path used to transmit the packet flow.

The packet flow includes at least one packet, and the forwarding device receives the packet flow within a continuous period, and also sends the packet flow to the collection device within the continuous period. Correspondingly, the collection device also receives the packet flow of the forwarding device within a continuous period, extracts a source address, a source port number, a destination address, a destination port number, and a used protocol of the packet flow from a packet header of a packet of the packet flow, and calculates, based on a data size of the received packet flow and duration of the period, a bandwidth occupied by the packet flow. In addition, each forwarding device receiving the packet flow in the communications network sends the packet flow to the collection device. Therefore, the collection device may determine each forwarding device sending the packet flow, and form the forwarding path of the packet flow with a device identifier of each forwarding device, to obtain the description information of the packet flow.

Step 3013: The policy control device receives the description information of each packet flow and displays the description information of each packet flow.

The policy control device may include a topological structural diagram of the communications network and routing information that is included on each forwarding device in the communications network and that is used to forward the packet flow. Each piece of routing information includes a destination address and information about a next hop. The information about the next hop may be a port number on the forwarding device, and a port corresponding to the port number is used to connect to another forwarding device.

This step may be: receiving, by the policy control device, the description information of each packet flow. For each packet flow, the topological structural diagram of the communications network displays information such as a forwarding path, a source address, a source port number, a destination address, a destination port number, a used protocol, and an occupied bandwidth included in the description information of the packet flow.

Figure 3B:
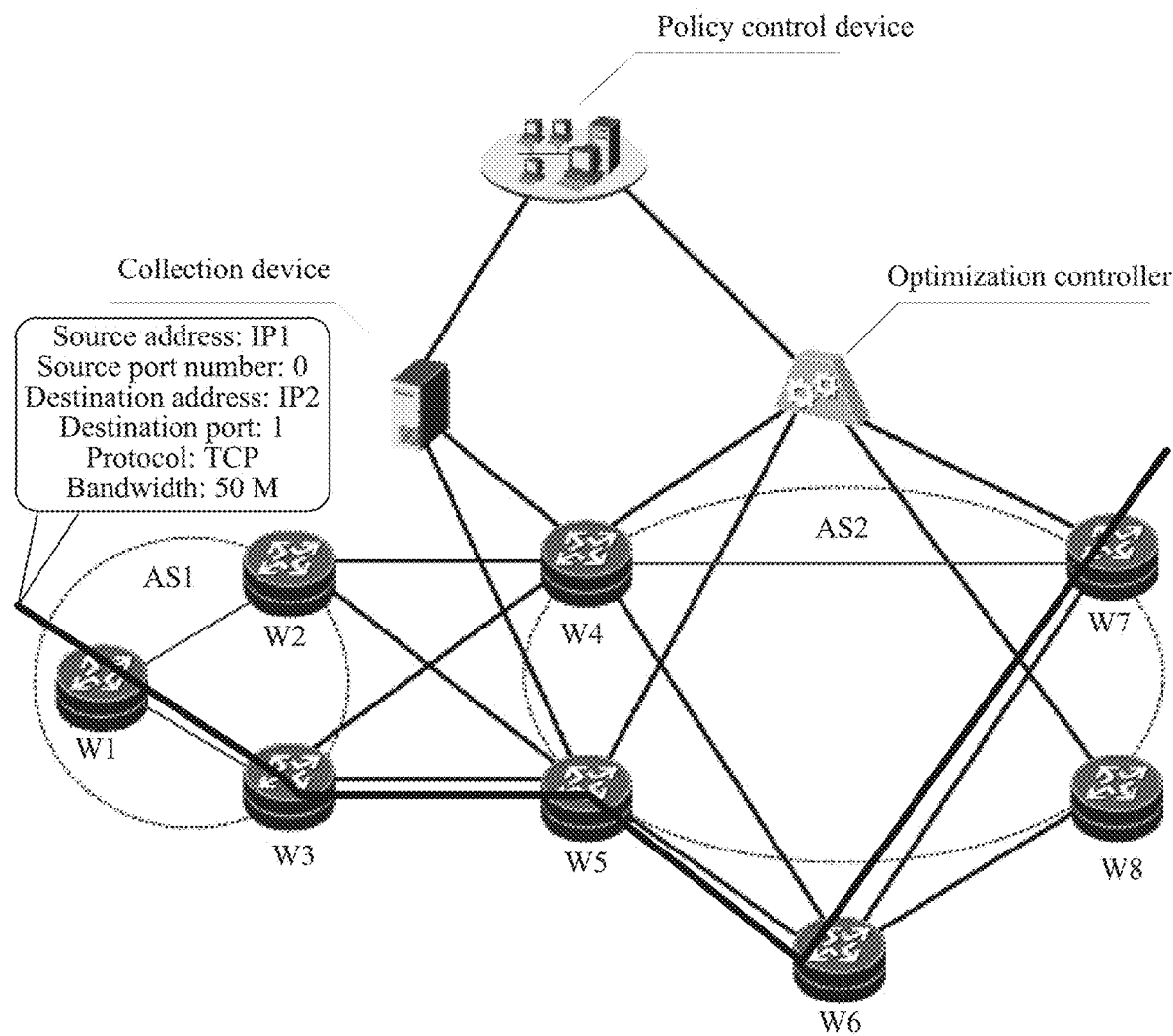
FIG. 3B is a topological structural diagram according to Embodiment 3 of the present disclosure.

For example, it is assumed that the policy control device displays a network topology diagram shown in FIG. 3B. There is a packet flow, and it is assumed that the packet flow passes through forwarding devices W1, W3, W5, W6, and W7. Description information of the packet flow includes a source address IP 1, a source port number 0, a destination address IP 2, a destination port number 1, a used protocol TCP (Transmission Control Protocol), an occupied bandwidth 50 M, and a forwarding path formed by device identifiers of the forwarding devices W1, W3, W5, W6, and W7 of the packet flow.

The network topology diagram shown in FIG. 3B displays a path. The path passes through the forwarding devices W1, W3, W5, W6, and W7, and the path is the forwarding path of the packet flow. The network topology diagram displays a source address IP 1, a source port number 0, a destination address IP 2, a destination port number 1, a used protocol TCP, and an occupied bandwidth 50 M of the packet flow.

After the policy control device displays the description information of each packet flow, the manager may configure the packet flow optimization policy on the policy control device. For example, the configuration process may be as follows:

First, the manager may select, as a to-be-adjusted target packet flow based on the description information of each packet flow that is displayed by the policy control device, a packet flow whose forwarding path needs to be adjusted, and configure a flow identifier of the target packet flow; next, select a forwarding device as a to-be-adjusted forwarding device from forwarding devices that the target packet flow passes through, indicating that the manager needs to adjust the forwarding path on which the to-be-adjusted forwarding device is located and that is used to transmit the target packet flow; and finally, configure information about an adjusted next hop corresponding to the to-be-adjusted forwarding device on the forwarding path. The forwarding device corresponding to the information about the next hop includes routing information used to forward the target packet flow. The policy control device obtains the flow identifier of the target packet flow selected by the manager, a device identifier of the to-be-adjusted forwarding device, and the information about the next hop, and forms the packet flow optimization policy.

The flow identifier configured by the manager includes at least one of a source address and a destination address of the target packet flow. When the flow identifier includes the source address of the target packet flow, it indicates that the manager intends to adjust a forwarding path of each packet flow corresponding to the source address, that is, each packet flow corresponding to the source address is a to-be-adjusted target packet flow. When the flow identifier includes the destination address of the target packet flow, it indicates that the manager intends to adjust a forwarding path of each packet flow corresponding to the destination address, that is, each packet flow corresponding to the destination address is the to-be-adjusted target packet flow. When the flow identifier includes the source address and the destination address of the target packet flow, it indicates that the manager intends to adjust a forwarding path of each packet flow corresponding to both the source address and the destination address, that is, each packet flow corresponding to both the source address and the destination address is the to-be-adjusted target packet flow.

The to-be-adjusted forwarding device selected by the manager is usually a forwarding device on an edge of an Autonomous System (AS). The communications network includes a plurality of ASs, and the manager usually selects a forwarding device on an edge of the AS as the to-be-adjusted forwarding device from forwarding devices that the target packet flow passes through.

The forwarding device corresponding to the information, about the next hop, configured by the manager includes routing information used to forward the target packet flow. A specific configuration process may be: first determining forwarding devices connected to the to-be-adjusted forwarding device in the topological structural diagram; obtaining, from the policy control device, routing information included on the determined forwarding devices; selecting, from the determined forwarding devices, a forwarding device including the routing information used to forward the target packet flow; finding, from the to-be-adjusted forwarding device, a port number of a port connected to the selected forwarding device; and using the port number as the information about the next hop. The routing information used to forward the target packet flow is routing information including the destination address of the target packet flow.

The communications network may be divided into a plurality of virtual private networks (VPN) on a logical layer, and the to-be-adjusted forwarding device includes a routing table corresponding to each VPN. When intending to transmit the target packet flow in a VPN, the manager may further select the VPN. Correspondingly, the policy control device may further obtain an attribute of the VPN selected by the manager, and the packet flow optimization policy may further include the attribute of the VPN.

For example, referring to the communications network shown in FIG. 3B, the manager may select a packet flow shown in the figure as the to-be-adjusted target packet flow, and configure that the flow identifier of the target packet flow includes a source address IP 1 and a destination address IP 2. The communications network includes two ASs: an AS 1 and an AS 2. Forwarding devices on an edge of the AS 1 are the forwarding devices W2 and W3. Therefore, the manager may select the forwarding device W3 on the edge of the AS 1 as the to-be-adjusted forwarding device from the forwarding devices W1, W3, W5, W6, and W7 that the target packet flow passes through.

Then, the manager configures the information about the adjusted next hop corresponding to the to-be-adjusted forwarding device W3 on the forwarding path, and a configuration process is as follows: the manager may determine, in the topological structural diagram shown in FIG. 3B, the forwarding devices W1, W4, and W5 connected to the to-be-adjusted forwarding device W3. It is assumed that the forwarding device W4 includes the routing information used to forward the target packet flow, and a port number of a port that is connected to the forwarding device W4 and that is on the to-be-adjusted forwarding device W3 is 1. The manager may select the forwarding device W4 and use, as the information about the next hop, the port number 1 of the port that is connected to the forwarding device W4 and that is on the to-be-adjusted forwarding device W3. Therefore, the packet flow optimization policy configured by the manager includes: the flow identifier, IP 1 and IP 2, of the target packet flow, the device identifier of the to-be-adjusted forwarding device W3, and the information about the next hop, the port number 1.

Step 302: The optimization controller receives the packet flow optimization policy, and obtains status information of an ACL of a to-be-adjusted forwarding device based on a device identifier, of the to-be-adjusted forwarding device, included in the packet flow optimization policy.

The status information of the ACL includes resource usage status information of the ACL and capability information, and the capability information is used to indicate whether the to-be-adjusted forwarding device supports packet flow forwarding that is based on the ACL.

The status information of the ACL may be obtained in the following two manners, including:

In a first manner, the status information of the ACL of the to-be-adjusted forwarding device is obtained based on the device identifier of the to-be-adjusted forwarding device and a correspondence, stored by the optimization controller, between a device identifier and status information of an ACL.

The correspondence between a device identifier and status information of an ACL may be obtained in advance in the manner provided in Embodiment 2, and details are not described herein again.

In a second manner, the to-be-adjusted forwarding device is queried for the status information of the ACL of the to-be-adjusted forwarding device based on the device identifier of the to-be-adjusted forwarding device.

Further, the optimization controller sends a reporting command to the to-be-adjusted forwarding device based on the device identifier of the to-be-adjusted forwarding device, where the reporting command carries indication information used to instruct the to-be-adjusted forwarding device to send a packet, and the packet may include the device identifier of the to-be-adjusted forwarding device and the status information of the ACL of the to-be-adjusted forwarding device or the packet may include the device identifier of the to-be-adjusted forwarding device and the usage status information of the forwarding chip of the to-be-adjusted forwarding device. The to-be-adjusted forwarding device receives the reporting command, and sends a packet to the optimization controller based on the indication information carried in the reporting command and the operation in step 201. The optimization controller receives the packet and obtains the device identifier of the to-be-adjusted forwarding device and the status information of the ACL of the to-be-adjusted forwarding device based on the operation in step 202.

Optionally, the reporting command may be a management information base (MIB) protocol packet or a simple network management protocol (SNMP) packet. One or more bits may be added to the MIB protocol packet or the SNMP packet, where the added bit is used to carry the indication information; or one or more reserved bits in the MIB protocol packet or the SNMP packet carry the indication information.

Step 303: When it is determined, based on the status information, that the ACL includes an idle resource and the to-be-adjusted forwarding device supports packet flow forwarding that is based on the ACL, the optimization controller sends an ACL record to the to-be-adjusted forwarding device, where the ACL record includes the flow identifier and the information about the next hop that are of the target packet flow.

The ACL record includes the flow identifier of the target packet flow and a forwarding rule, and the forwarding rule includes the information, about the next hop, of the target packet flow.

The to-be-adjusted forwarding device receives the ACL record and stores the ACL record in the ACL included in the to-be-adjusted forwarding device. Subsequently, when receiving the target packet flow, the to-be-adjusted forwarding device queries the ACL for the information, about the next hop, of the target packet flow based on the flow identifier of the target packet flow, and forwards the target packet flow based on the information about the next hop.

Further, when it is determined that the ACL includes an idle resource and the to-be-adjusted forwarding device supports packet flow forwarding that is based on the ACL, the optimization controller may further determine whether a size of the idle resource included in the ACL is less than a preset threshold. If the size of the idle resource included in the ACL is less than the preset threshold, the optimization controller obtains a priority of the target packet flow; when the priority reaches a specified priority, sends the ACL record to the to-be-adjusted forwarding device; and when the priority does not reach the specified priority and the flow identifier of the target packet flow includes a destination address of the target packet flow, sends routing information including the destination address and the information about the next hop to the to-be-adjusted forwarding device.

When the priority does not reach the specified priority and the flow identifier of the target packet flow does not include the destination address of the target packet flow, the optimization controller sends error information to the policy control device. The policy control device receives the error information and prompts the manager.

The optimization controller may store a correspondence between a flow identifier and a priority in advance. The optimization controller may obtain the priority of the target packet flow based on the flow identifier of the target packet flow and the correspondence between a flow identifier and a priority.

Optionally, in this step, the optimization controller may further determine that an adjustment manner corresponding to the target packet flow is an ACL adjustment manner, and correspondingly store the ACL adjustment manner and the packet flow optimization policy in a correspondence between an adjustment manner and a packet flow optimization policy.

Optionally, after storing the ACL record in the ACL of the to-be-adjusted forwarding device, the to-be-adjusted forwarding device may further determine whether the flow identifier included in the ACL record is the destination address of the target packet flow; and if yes, extract the destination address and the information, about the next hop, of the target packet flow from the ACL record, store the routing information including the destination address and the information about the next hop that are of the target packet flow in a routing table of the to-be-adjusted forwarding device, and delete the ACL record from the ACL of the to-be-adjusted forwarding device.

Step 304: When the flow identifier of the target packet flow includes the destination address of the target packet flow and it is determined, based on the status information, that the ACL has no idle resource or the to-be-adjusted forwarding device does not support packet flow forwarding that is based on the ACL, the optimization controller sends routing information to the to-be-adjusted forwarding device, where the routing information includes the destination address and the information, about the next hop, of the target packet flow.

Optionally, the routing information may further include information such as a community attribute.

The to-be-adjusted forwarding device receives the routing information and stores the routing information in the routing table included in the to-be-adjusted forwarding device. Subsequently, when receiving the target packet flow, the to-be-adjusted forwarding device queries the routing table for the information, about the next hop, of the target packet flow based on the flow identifier of the target packet flow, and forwards the target packet flow based on the information about the next hop.

Optionally, when the packet flow optimization policy further includes an attribute of a VPN, the routing information may further include the attribute of the VPN. Correspondingly, after receiving the routing information, the to-be-adjusted forwarding device may store, based on the attribute of the VPN, the routing information in a routing table corresponding to the VPN.

Optionally, in this step, the optimization controller may further determine that an adjustment manner corresponding to the target packet flow is a routing table adjustment manner, and correspondingly store the routing table adjustment manner and the packet flow optimization policy in a correspondence between an adjustment manner and a packet flow optimization policy.

Optionally, after adjusting the forwarding path of the target packet flow, the optimization controller further periodically or aperiodically detects whether the adjustment manner configured for the target packet flow is suitable. A detailed implementation process is as follows:

In a first step, the optimization controller obtains the adjustment manner of the target packet flow and the packet flow optimization policy based on the stored correspondence between an adjustment manner and a packet flow optimization policy, and obtains the flow identifier of the target packet flow, the device identifier of the to-be-adjusted forwarding device, and the information about the next hop that are included in the packet flow optimization policy.

In a second step, when the adjustment manner is an ACL adjustment manner and the flow identifier is the destination address of the target packet flow, the optimization controller controls the to-be-adjusted forwarding device to store the routing information including the destination address and the information about the next hop in the routing table, and to delete the ACL record including the flow identifier and the information about the next hop from the ACL.

During in an embodiment implementation, the optimization controller sends an adjustment command to the to-be-adjusted forwarding device, where the adjustment command carries the flow identifier and the routing information including the destination address and the information about the next hop. The to-be-adjusted forwarding device receives the adjustment command, and stores the routing information including the destination address and the information about the next hop in the routing table, and deletes the ACL record including the flow identifier and the information about the next hop from the ACL according to instruction by the adjustment command.

When the flow identifier is the destination address of the target packet flow, the packet flow corresponding to the flow identifier may be forwarded using the routing table. Therefore, the ACL record including the flow identifier and the information about the next hop may be deleted such that space resources in the ACL having a limited space size are released, and another packet flow that cannot be forwarded using the routing table is forwarded using the ACL, thereby improving resource utilization.

In a third step, when the adjustment manner is a routing table adjustment manner and the flow identifier includes the source address and the destination address of the target packet flow, the optimization controller determines whether the ACL of the to-be-adjusted forwarding device includes an idle resource and whether the to-be-adjusted forwarding device supports packet flow forwarding that is based on the ACL. If the ACL of the to-be-adjusted forwarding device includes an idle resource and the to-be-adjusted forwarding device supports packet flow forwarding that is based on the ACL, the optimization controller controls the to-be-adjusted forwarding device to store the ACL record including the flow identifier and the information about the next hop of the target packet flow in the ACL, and to delete the routing information including the destination address and the information about the next hop from the routing table.

During an embodiment implementation, the optimization controller queries the to-be-adjusted forwarding device to determine whether the ACL of the to-be-adjusted forwarding device includes an idle resource and whether the to-be-adjusted forwarding device supports packet flow forwarding that is based on the ACL. If the ACL of the to-be-adjusted forwarding device includes an idle resource and the to-be-adjusted forwarding device supports packet flow forwarding that is based on the ACL, the optimization controller sends an adjustment command to the to-be adjusted forwarding device, where the adjustment command carries the destination address and the ACL record including the flow identifier and the information about the next hop that are of the target packet flow. The to-be-adjusted forwarding device receives the adjustment command, and stores the ACL record including the flow identifier and the information about the next hop that are of the target packet flow in the ACL, and deletes the routing information including the destination address and the information about the next hop from the routing table according to instruction by the adjustment command.

In this embodiment, when receiving the packet flow optimization policy, the optimization controller obtains the status information of the ACL of the to-be-adjusted forwarding device; determines, based on the status information, whether the ACL includes an idle resource and whether the to-be-adjusted forwarding device supports packet flow forwarding that is based on the ACL; and only when it is determined that the ACL includes an idle resource and the to-be-adjusted forwarding device supports packet flow forwarding that is based on the ACL, sends the ACL record to the to-be-forwarded device. Compared with a current solution, this manner does not require a time used to try out the to-be-adjusted forwarding device and reduces resource waste caused by sending the ACL record.

Embodiment 4

Figure 4:
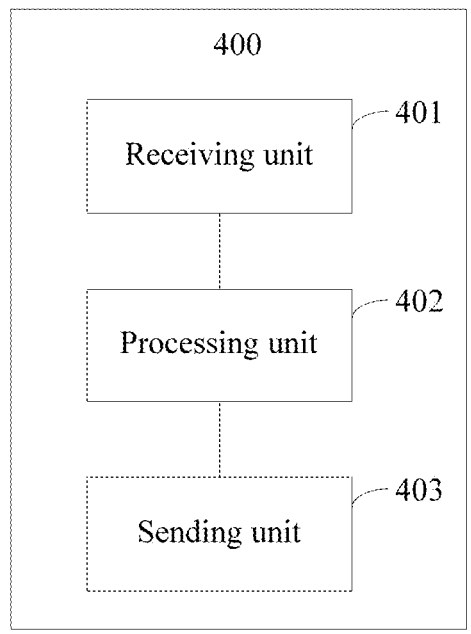
FIG. 4 is a schematic structural diagram of a forwarding path adjustment apparatus according to Embodiment 4 of the present disclosure.

Referring to FIG. 4, an embodiment of the present disclosure provides a forwarding path adjustment apparatus 400. The apparatus 400 includes: a receiving unit 401 configured to receive a packet flow optimization policy, where the packet flow optimization policy includes a flow identifier of a to-be-adjusted target packet flow, a device identifier of a to-be-adjusted forwarding device, and information about an adjusted next hop corresponding to the to-be-adjusted forwarding device that is on a forwarding path of the target packet flow; a processing unit 402 configured to obtain status information of an ACL of the to-be-adjusted forwarding device based on the device identifier, where the status information includes resource usage status information of the ACL and capability information, and the capability information is used to indicate whether the to-be-adjusted forwarding device supports packet flow forwarding that is based on the ACL; and a sending unit 403 configured to, when it is determined, based on the status information, that the ACL includes an idle resource and the to-be-adjusted forwarding device supports packet flow forwarding that is based on the ACL, send an ACL record to the to-be-adjusted forwarding device, where the ACL record includes the flow identifier and the information about the next hop such that the to-be-adjusted forwarding device stores the ACL record in the ACL of the to-be-adjusted forwarding device.

In a possible implementation, the processing unit 402 may be configured to: when a size of the idle resource included in the ACL is less than or equal to a preset threshold, obtain a priority of the target packet flow; and the sending unit 403 may be configured to: when the priority reaches a specified priority, send the ACL record to the to-be-adjusted forwarding device.

In a possible implementation, the apparatus 400 may store a correspondence between a flow identifier and a priority in advance. The processing unit 402 may obtain the priority of the target packet flow based on the flow identifier of the target packet flow and the correspondence between a flow identifier and a priority.

In a possible implementation, the processing unit 402 may determine that an adjustment manner corresponding to the target packet flow is an ACL adjustment manner, and correspondingly store the ACL adjustment manner and the packet flow optimization policy in a correspondence between an adjustment manner and a packet flow optimization policy.

In a possible implementation, the flow identifier is a destination address of the target packet flow; and the processing unit 402 is further configured to control the to-be-adjusted forwarding device to store routing information including the destination address and the information about the next hop in a routing table of the to-be-adjusted forwarding device, and to delete the ACL record from the ACL of the to-be-adjusted forwarding device.

In a possible implementation, the processing unit 402 periodically or aperiodically obtains an adjustment manner and a packet flow optimization policy of the target packet flow based on the stored correspondence between an adjustment manner and a packet flow optimization policy. When the adjustment manner is the ACL adjustment manner and the flow identifier is the destination address of the target packet flow, the to-be-adjusted forwarding device may be controlled to store the routing information including the destination address and the information about the next hop in the routing table of the to-be-adjusted forwarding device and delete the ACL record from the ACL of the to-be-adjusted forwarding device.

In a possible implementation, the flow identifier includes a destination address of the target packet flow; and the sending unit 403 is further configured to: when the processing unit 402 determines, based on the status information, that the ACL has no idle resource or the to-be-adjusted forwarding device does not support packet flow forwarding that is based on the ACL, send routing information to the to-be-adjusted forwarding device, where the routing information includes the destination address and the information about the next hop such that the to-be-adjusted forwarding device stores the routing information in a routing table of the to-be-adjusted forwarding device.

In a possible implementation, the processing unit 402 is further configured to: determine that an adjustment manner corresponding to the target packet flow is a routing table adjustment manner, and correspondingly store the routing table adjustment manner and the packet flow optimization policy in a correspondence between an adjustment manner and a packet flow optimization policy.

In a possible implementation, the flow identifier further includes a source address of the target packet flow; and the processing unit 402 is further configured to: when it is determined that the current ACL includes an idle resource and the to-be-adjusted forwarding device supports packet flow forwarding that is based on the ACL, control the to-be-adjusted forwarding device to store the ACL record including the flow identifier and the information about the next hop in the ACL of the to-be-adjusted forwarding device, and to delete the routing information from the routing table of the to-be-adjusted forwarding device.

In a possible implementation, the processing unit 402 periodically or aperiodically obtains an adjustment manner and a packet flow optimization policy of the target packet flow based on the stored correspondence between an adjustment manner and a packet flow optimization policy. When the adjustment manner is the routing table adjustment manner and the flow identifier further includes the source address of the target packet flow, the to-be-adjusted forwarding device may be controlled to store the ACL record including the flow identifier and the information about the next hop in the ACL of the to-be-adjusted forwarding device and delete the routing information from the routing table of the to-be-adjusted forwarding device.

In a possible implementation, the processing unit 402 is configured to: obtain the status information of the ACL of the to-be-adjusted forwarding device based on the device identifier and a correspondence, stored by the apparatus 400, between a device identifier and status information of an ACL; or query the to-be-adjusted forwarding device for the status information of the ACL of the to-be-adjusted forwarding device based on the device identifier.

In a possible implementation, an implementation process of querying, by the processing unit 402, the to-be-adjusted forwarding device for the status information of the ACL of the to-be-adjusted forwarding device based on the device identifier may be as follows:

The processing unit 402 may send a reporting command to the to-be-adjusted forwarding device based on the device identifier of the to-be-adjusted forwarding device using the sending unit 403, where the reporting command carries indication information used to instruct the to-be-adjusted forwarding device to send a packet, and the packet may include the device identifier of the to-be-adjusted forwarding device and the status information of the ACL of the to-be-adjusted forwarding device or the packet may include the device identifier of the to-be-adjusted forwarding device and usage status information of a forwarding chip. The processing unit 402 may receive, using the receiving unit 401, the packet sent by the to-be-adjusted forwarding device, and obtain the device identifier of the to-be-adjusted forwarding device and the status information of the ACL of the to-be-adjusted forwarding device based on the operation in step 202.

In a possible implementation, when the processing unit 402 obtains the status information of the ACL of the to-be-adjusted forwarding device based on the device identifier and the correspondence, stored by the apparatus 400, between a device identifier and status information of an ACL, the receiving unit 401 is further configured to receive the packet sent by the to-be-adjusted forwarding device.

The processing unit 402 is configured to: obtain the device identifier of the to-be-adjusted forwarding device and the status information of the ACL of the to-be-adjusted forwarding device based on the packet; and correspondingly store the device identifier of the to-be-adjusted forwarding device and the status information of the ACL of the to-be-adjusted forwarding device in the correspondence between a device identifier and status information of an ACL.

The processing unit 402 may further obtain the device identifier of the to-be-adjusted forwarding device and the status information of the ACL of the to-be-adjusted forwarding device based on the operation in step 202.

In a possible implementation, the packet includes the device identifier of the to-be-adjusted forwarding device and the usage status information of the forwarding chip of the to-be-adjusted forwarding device; and the processing unit 402 is configured to: extract the device identifier of the to-be-adjusted forwarding device and the usage status information of the forwarding chip of the to-be-adjusted forwarding device that are included in the packet; and obtain the status information of the ACL of the to-be-adjusted forwarding device based on the usage status information of the forwarding chip.

The packet includes a TLV field, the TLV field includes a type T field, a length L field, and a value V field, and the processing unit 402 obtains the status information of the ACL based on content carried in the V field.

The packet may be an OSPF packet or an ISIS packet, and the TLV field is added in the OSPF packet and the ISIS packet. For detailed structures of the ODPF packet and the ISIS packet, refer to step 201 and related content in FIG. 2B to FIG. 2G in the specification, and detailed descriptions are not described herein again.

In this embodiment, when receiving the packet flow optimization policy, the forwarding path adjustment apparatus obtains the status information of the ACL of the to-be-adjusted forwarding device; determines, based on the status information, whether the ACL includes an idle resource and whether the to-be-adjusted forwarding device supports packet flow forwarding that is based on the ACL; and only when it is determined that the ACL includes an idle resource and the to-be-adjusted forwarding device supports packet flow forwarding that is based on the ACL, sends the ACL record to the to-be-adjusted forwarded device. Compared with a current solution, this manner does not require a time used to try out the to-be-adjusted forwarding device and reduces resource waste caused by sending the ACL record.

Embodiment 5

Figure 5:
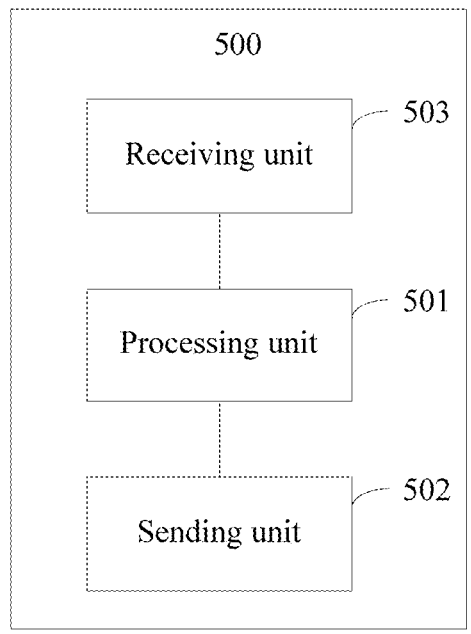
FIG. 5 is a schematic structural diagram of a forwarding path adjustment apparatus according to Embodiment 5 of the present disclosure.

Referring to FIG. 5, an embodiment of this application provides a forwarding path adjustment apparatus 500. The apparatus 500 includes: a processing unit 501 configured to obtain usage status information of a forwarding chip or status information of an ACL; and generate a packet, where the packet carries the usage status information of the forwarding chip or the status information of the ACL; and a sending unit 502 configured to send the packet to an optimization controller, where the usage status information of the forwarding chip or the status information of the ACL is used by the optimization controller to obtain the status information of the ACL of the apparatus 500, where the status information includes resource usage status information of the ACL and capability information, the capability information is used to indicate whether the apparatus 500 supports packet flow forwarding that is based on the ACL, and the status information of the ACL is used by the optimization controller to adjust a forwarding path of a packet flow transmitted by the apparatus 500.

The packet includes a TLV field, the TLV field includes a type T field, a length L field, and a value V field, and the V field carries the usage status information of the forwarding chip or the status information of the ACL.

The packet may be an OSPF packet or an ISIS packet, and the TLV field is added in the OSPF packet and the ISIS packet. For detailed structures of the ODPF packet and the ISIS packet, refer to step 201 and related content in FIG. 2B to FIG. 2G in the specification, and detailed descriptions are not described herein again.

In a possible implementation, the apparatus 500 further includes: a receiving unit 503; the receiving unit 503 is configured to receive an ACL record sent by the optimization controller, where the ACL record includes a flow identifier of a to-be-adjusted target packet flow and information about an adjusted next hop corresponding to the apparatus 500 that is on a forwarding path of the target packet flow; and the processing unit 501 is further configured to store the ACL record in the ACL of the apparatus 500.

In a possible implementation, the flow identifier is a destination address of the target packet flow, and the processing unit 501 is further configured to: store routing information including the destination address of the target packet flow and the information about the next hop in a routing table of the apparatus 500, and delete the ACL record from the ACL.

For example, during implementation, there may be the following two manners:

In a first manner, the receiving unit 503 receives the flow identifier of the target packet flow and the routing information sent by the optimization controller, where the routing information includes the destination address of the target packet flow and the information about the next hop; and stores the routing information in the routing table of the apparatus 500, and deletes the ACL record including the flow identifier of the target packet flow from the ACL.

In a second manner, after storing the ACL record in the ACL of the apparatus 500, the processing unit 501 may further determine whether the flow identifier included in the ACL record is the destination address of the target packet flow; and if yes, may store routing information including the destination address of the target packet flow and the information about the next hop in the routing table of the apparatus 500, and delete the ACL record from the ACL of the apparatus 500.

In a possible implementation, the flow identifier includes a destination address of the target packet flow; the receiving unit 503 is further configured to receive the routing information sent by the optimization controller, where the routing information includes the destination address of the to-be-adjusted target packet flow and information about an adjusted next hop corresponding to the apparatus 500 on a forwarding path of the target packet flow; and the processing unit 501 is further configured to store the routing information in the routing table of the apparatus 500.

In a possible implementation, the flow identifier of the target packet flow includes a source address of the target packet flow; the receiving unit 503 is further configured to receive the ACL record sent by the optimization controller, where the ACL record includes the flow identifier and the information about the next hop; and the processing unit 501 is further configured to: store the ACL record in the ACL of the apparatus 500; and delete the routing information from the routing table.

In this embodiment, the optimization controller may obtain the status information of the ACL of the apparatus 500 using the packet such that the optimization controller adjusts a forwarding path of a packet flow transmitted by the apparatus 500.

Embodiment 6

Figure 6:
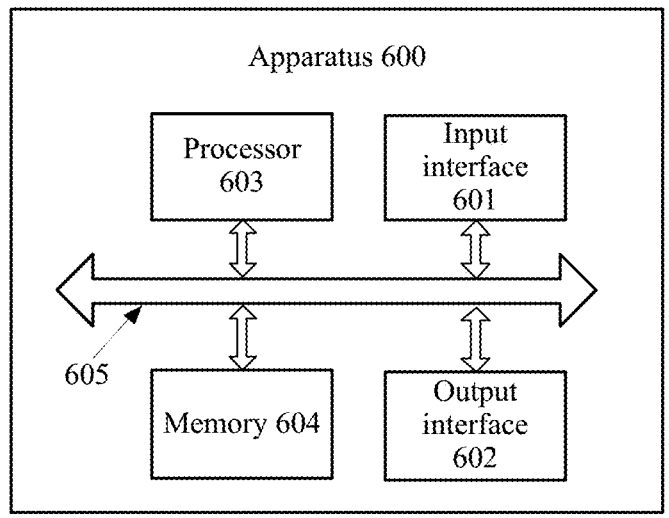
FIG. 6 is a schematic structural diagram of a forwarding path adjustment apparatus according to Embodiment 6 of the present disclosure.

FIG. 6 is another schematic diagram of a forwarding path adjustment apparatus 600 according to an embodiment of this application. The apparatus 600 may be the optimization controller in the figure, and may be configured to perform the method shown in FIG. 2A and FIG. 3A. As shown in FIG. 6, the apparatus 600 includes: an input interface 601, an output interface 602, a processor 603, and a memory 604. The input interface 601, the output interface 602, the processor 603, and the memory 604 may be connected using a bus system 605.

The memory 604 is configured to store a program, an instruction, or code. The processor 603 is configured to execute the program, the instruction, or the code in the memory 604, to control the input interface 601 to receive a signal and control the output interface 602 to send a signal, and perform the steps and the functions performed by the optimization controller in the implementations corresponding to FIG. 2A and FIG. 3A. Details are not described herein again. For specific implementations of the input interface 601, the processor 603, and the output interface 602, correspondingly refer to specific descriptions of the receiving unit 401, the processing unit 402, and the sending unit 403 in FIG. 4. Details are not described herein again.

Figure 7:
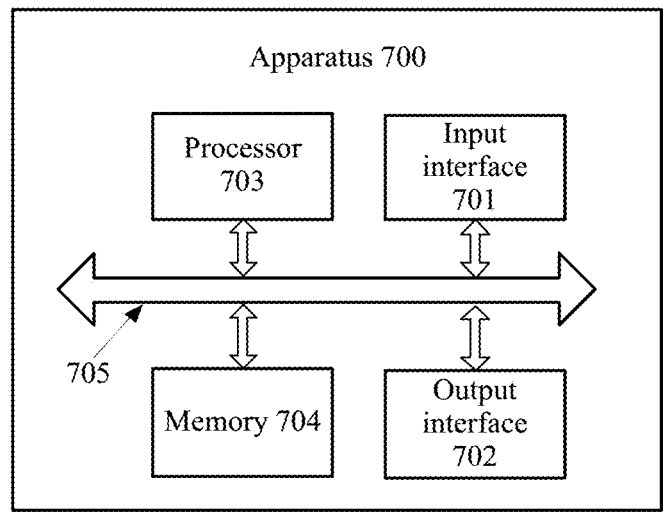
FIG. 7 is a schematic structural diagram of another forwarding path adjustment apparatus according to Embodiment 6 of the present disclosure.

FIG. 7 is another schematic diagram of a forwarding path adjustment apparatus 700 according to an embodiment of this application. As shown in FIG. 7, the apparatus 700 may be the to-be-adjusted forwarding device in the figure and includes: an input interface 701, an output interface 702, a processor 703, and a memory 704. The input interface 701, the output interface 702, the processor 703, and the memory 704 may be connected using a bus system 705.

The memory 704 is configured to store a program, an instruction, or code. The processor 703 is configured to execute the program, the instruction, or the code in the memory 704, to control the input interface 701 to receive a signal and control the output interface 702 to send a signal, and perform the steps and the functions performed by the to-be-adjusted forwarding device in the implementations corresponding to FIG. 2A and FIG. 3A. Details are not described herein again. For specific implementations of the input interface 701, the output interface 702, and the processor 703, correspondingly refer to specific descriptions of the receiving unit 503, the sending unit 502, and the processing unit 501 in the implementation of FIG. 5. Details are not described herein again.

It should be understood that in the embodiments of this application, the processor 603 and the processor 703 may be a central processing unit (CPU), or the processor 603 and the processor 703 may be other general purpose processors, digital signal processors (DSP), application-specific integrated circuits (ASIC), field programmable gate arrays (FPGA), or other programmable logic devices, discrete gates or transistor logic devices, discrete hardware components, or the like. The general purpose processor may be a microprocessor, or the processor may be any conventional processor or the like.

The memory 604 and the memory 704 may include a read-only memory and a random access memory, and provide instructions and data to the processor 603 and the processor 703. A part of the memory 604 or the memory 704 may further include a non-volatile random access memory. For example, the memory 604 or the memory 704 may further store information about a device type.

The bus system 605 and the bus system 705, besides including a data bus, may further include a power supply bus, a control bus, a status signal bus, and the like. However, for clear description, various types of buses in the figure are marked as the bus system.

In an implementation process, each step of the method shown in FIG. 2A and/or FIG. 3A may be completed using an integrated logic circuit of hardware in the processor 603 and the processor 703 or an instruction in a software form. The steps of the method disclosed with reference to the embodiments of this application may be directly performed by a hardware processor, or may be performed using a combination of hardware in the processor and a software unit. The software unit may be located in a mature storage medium in the art, such as a random access memory, a flash memory, a read-only memory, a programmable read-only memory, an electrically erasable programmable memory, a register, or the like. The storage medium is located in each of the memory 604 and the memory 704, the processor 603 reads information in the memory 604 and the processor 703 reads information in the memory 704, to perform steps in the method 100 in FIG. 2A and/or FIG. 3A in combination with hardware thereof. To avoid repetition, details are not described herein again.

It should be noted that in a specific implementation, the processing unit 402 in FIG. 4 may be implemented by the processor 603 in FIG. 6, the sending unit 403 may be implemented by the output interface 602 in FIG. 6, and the receiving unit 501 may be implemented by the input interface 601 in FIG. 6. Similarly, the processing unit 501 in FIG. 5 is implemented by the processor 703 in FIG. 7, the sending unit 502 may be implemented by the output interface 702 in FIG. 7, and the receiving unit 503 may be implemented by the input interface 701 in FIG. 7.

Embodiment 7

Figure 8:
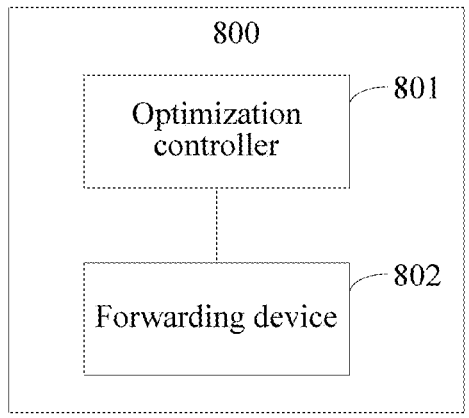
FIG. 8 is a schematic structural diagram of a forwarding path adjustment system according to Embodiment 7 of the present disclosure.

This application further provides a forwarding path adjustment system 800. The system includes the apparatus in FIG. 4 or FIG. 6 and the apparatus in FIG. 5 or FIG. 7. Referring to FIG. 8, the apparatus in FIG. 4 or FIG. 6 may be an optimization controller 801, and the apparatus in FIG. 5 or 7 may be a forwarding device 802. The system 800 is configured to perform the method in the embodiment corresponding to FIG. 2A and/or FIG. 3A.

It should be noted that when the forwarding path adjustment apparatus provided in the foregoing embodiment adjusts a forwarding path, division of the functional units is only used as an example for description. In an in an embodiment application, the foregoing functions may be allocated to different functional units for implementation based on a requirement, that is, the internal structure of the apparatus is divided into different functional units, to implement some or all functions described above. In addition, the embodiments of the forwarding path adjustment apparatus and the forwarding path adjustment method provided in the foregoing embodiments belong to a same idea. For a specific implementation process thereof, refer to the method embodiment and details are not described herein again.

Numbers of the embodiments of the present disclosure are only for description purpose, and do not indicate preference of the embodiments.

It should be understood that sequence numbers of the foregoing processes do not mean execution sequences in the embodiments of this application. The execution sequences of the processes should be determined according to functions and internal logic of the processes, and should not be construed as any limitation on the implementation processes of the embodiments of this application.

A person of ordinary skill in the art may be aware that, in combination with the examples described in the embodiments disclosed in this specification, units and steps of methods may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

All or some of the foregoing embodiments may be implemented by means of software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedures or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a soft disk, a hard disk, or a magnetic tape), an optical medium (for example, a digital versatile disc (DVD)), a semiconductor medium (for example, a solid state disk (SSD)), or the like. The embodiments in this specification are all described in a progressive manner, for same or similar parts in the embodiments, refer to these embodiments, and each embodiment focuses on a difference from other embodiments. Especially, apparatus and system embodiments are basically similar to a method embodiment, and therefore are described briefly; for related parts, refer to partial descriptions in the method embodiment.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A forwarding path adjustment method, comprising:
    obtaining, by a forwarding device, usage status information of a forwarding chip or status information of an access control list (ACL);
    generating, by the forwarding device, a packet comprising the usage status information of the forwarding chip or the status information of the ACL; and
    sending, by the forwarding device, the packet to an optimization controller, wherein the usage status information of the forwarding chip or the status information of the ACL enables the optimization controller to obtain the status information of the ACL, wherein the status information comprises resource usage status information of the ACL and capability information, wherein the capability information indicates whether the forwarding device supports packet flow forwarding that is based on the ACL, and wherein the status information of the ACL enables the optimization controller to adjust a forwarding path of a packet flow transmitted by the forwarding device.

2. The forwarding path adjustment method of claim 1, wherein the packet comprises a type length value (TLV) field, wherein the TLV field comprises a type (T) field, a length (L) field, and a value (V) field, and wherein the V field comprises the usage status information of the forwarding chip or the status information of the ACL.

3. The forwarding path adjustment method of claim 1, wherein after the sending, by the forwarding device, the packet to an optimization controller, the method further comprises:
    receiving, by the forwarding device, an ACL record from the optimization controller, wherein the ACL record comprises a flow identifier of a target packet flow and information about an adjusted next hop corresponding to the forwarding device that is on a forwarding path of the target packet flow; and
    storing, by the forwarding device, the ACL record in the ACL of the forwarding device.

4. The forwarding path adjustment method of claim 3, wherein the flow identifier is a destination address of the target packet flow, and wherein after the storing, the method further comprises:
    storing, by the forwarding device, routing information comprising the destination address and the information about a next hop in a routing table of the forwarding device; and
    deleting, by the forwarding device, the ACL record from the ACL.

5. The forwarding path adjustment method of claim 1, wherein after the sending, the method further comprises:
    receiving, by the forwarding device, routing information from the optimization controller, wherein the routing information comprises a destination address of a target packet flow and information about an adjusted next hop that corresponds to the forwarding device that is on a forwarding path of the target packet flow; and
    storing, by the forwarding device, the routing information in a routing table of the forwarding device.

6. The forwarding path adjustment method of claim 5, wherein a flow identifier of the target packet flow comprises a source address of the target packet flow, and wherein after storing, by the forwarding device, the routing information in the routing table of the forwarding device, the method further comprises:
receiving, by the forwarding device, an ACL record from the optimization controller, wherein the ACL record comprises the flow identifier and the information about the adjusted next hop;
storing, by the forwarding device, the ACL record in the ACL of the forwarding device; and
deleting, by the forwarding device, the routing information from the routing table.

7. A forwarding path adjustment apparatus, comprising:
a non-transitory memory comprising instructions; and
a processor in communications with the non-transitory memory and configured to execute the instructions, wherein the instructions cause the processor to:
receive a packet flow optimization policy; wherein the packet flow optimization policy comprises each of a flow identifier of a target packet flow, a device identifier of a forwarding device, and information about an adjusted next hop corresponding to the forwarding device that is on a forwarding path of the target packet flow;
obtain status information of an access control list ACL based on the device identifier, wherein the status information comprises resource usage status information of the ACL and capability information, wherein the capability information indicates whether the forwarding device supports packet flow forwarding that is based on the ACL; and
send an ACL record to the forwarding device when determining, based on the status information, that the ACL comprises an idle resource and the forwarding device supports packet flow forwarding, wherein the ACL record comprises the flow identifier and the information about a next hop to enable the forwarding device to store the ACL record in the ACL of the forwarding device so as to permit the forwarding device to send forward information associated with the next hop.

8. The forwarding path adjustment apparatus of claim 7, wherein the instructions further cause the processor to:
obtain a priority of the target packet flow when a size of the idle resource comprised in the ACL is less than or equal to a preset threshold; and
send the ACL record to the forwarding device based on the priority reaching a specified priority.

9. The forwarding path adjustment apparatus of claim 7, wherein the flow identifier is a destination address of the target packet flow, and wherein the instructions further cause the processor to:
control the forwarding device to store routing information comprising the destination address and the information about the next hop in a routing table of the forwarding device; and
instruct the forwarding device to delete the ACL record from the ACL of the forwarding device.

10. The forwarding path adjustment apparatus of claim 7, wherein the flow identifier comprises a destination address of the target packet flow, and wherein the instructions further cause the processor to:
send routing information to the forwarding device when determining that the ACL has no idle resource or the forwarding device does not support packet flow forwarding that is based on the ACL, wherein the routing information comprises the destination address and the information about the next hop such that the forwarding device stores the routing information in a routing table of the forwarding device.

11. The forwarding path adjustment apparatus of claim 7, wherein the flow identifier further comprises a source address of the target packet flow, and wherein the instructions further cause the processor to:
control the forwarding device to store the ACL record comprising the flow identifier and the information about the next hop in the ACL of the forwarding device when determining that a current ACL comprises an idle resource and the forwarding device supports packet flow forwarding that is based on the ACL; and
delete the routing information from a routing table of the forwarding device.

12. The forwarding path adjustment apparatus of claim 7, wherein the instructions further cause the processor to:
obtain the status information of the ACL of the forwarding device based on the device identifier and a correspondence between a device identifier and status information of an ACL, wherein the correspondence is stored by the forwarding path adjustment apparatus.

13. The forwarding path adjustment apparatus of claim 12, wherein the instructions further cause the processor to:
receive a packet from the forwarding device;
obtain the device identifier of the forwarding device and the status information of the ACL based on the packet; and
store, after obtaining the device identifier and the status information of the ACL, a correspondence between the device identifier of the forwarding device and the status information of the ACL of the forwarding device.

14. The forwarding path adjustment apparatus of claim 13, wherein the packet comprises the device identifier of the forwarding device and usage status information of a forwarding chip, and wherein the instructions further cause the processor to:
extract the device identifier of the forwarding device and the usage status information of the forwarding chip of the forwarding device that are comprised in the packet; and
obtain the status information of the ACL of the forwarding device based on the usage status information of the forwarding chip.

15. A forwarding path adjustment apparatus, comprising:
a non-transitory memory comprising instructions; and
a processor in communications with the non-transitory memory and configured to execute the instructions, wherein the instructions cause the processor to:
obtain usage status information of a forwarding chip or status information of an access control list (ACL), wherein the forwarding path adjustment apparatus comprises the ACL;
generate a packet comprising the usage status information of the forwarding chip or the status information of the ACL; and
send the packet to an optimization controller, wherein the usage status information of the forwarding chip or the status information of the ACL enables the optimization controller to obtain the status information of the ACL, wherein the status information comprises resource usage status information of the ACL and capability information, wherein the capability information indicates whether the forwarding path adjustment apparatus supports packet flow forwarding that is based on the ACL, and wherein the status information of the ACL enables the optimization controller to adjust a forwarding path of a packet flow transmitted by the forwarding path adjustment apparatus.

16. The forwarding path adjustment apparatus of claim 15, wherein the packet comprises a type length value (TLV) field, wherein the TLV field comprises a type (T) field, a length (L) field, and a value (V) field, and wherein the V field comprises the usage status information of the forwarding chip or the status information of the ACL.

17. The forwarding path adjustment apparatus of claim 15, wherein the instructions further cause the processor to:
  receive an ACL record from the optimization controller, wherein the ACL record comprises a flow identifier of a target packet flow and information about an adjusted next hop corresponding to the forwarding path adjustment apparatus on a forwarding path of the target packet flow; and
  store the ACL record in the ACL.

18. The forwarding path adjustment apparatus of claim 17, wherein the flow identifier is a destination address of the target packet flow; and wherein the instructions further cause the processor to:
  store routing information comprising the destination address and the information about a next hop in a routing table of the forwarding path adjustment apparatus; and
  delete the ACL record from the ACL.

19. The forwarding path adjustment apparatus of claim 15, wherein the instructions further cause the processor to:
  receive routing information from the optimization controller, wherein the routing information comprises a destination address of a target packet flow and information about an adjusted next hop that corresponds to the forwarding path adjustment apparatus that is on a forwarding path of the target packet flow; and
  store the routing information in a routing table of the forwarding path adjustment apparatus.

20. The forwarding path adjustment apparatus of claim 19, wherein a flow identifier of the target packet flow comprises a source address of the target packet flow, and wherein the instructions further cause the processor to:
  receive an ACL record from the optimization controller, wherein the ACL record comprises the flow identifier and the information about the adjusted next hop;
  store the ACL record in the ACL of the forwarding path adjustment apparatus; and
  delete the routing information from the routing table.

* * * * *

UNITED STATES PATENT AND TRADEMARK OFFICE
CERTIFICATE OF CORRECTION

PATENT NO. : 11,063,874 B2
APPLICATION NO. : 16/519917
DATED : July 13, 2021
INVENTOR(S) : Nan Wu et al.

Page 1 of 1

It is certified that error appears in the above-identified patent and that said Letters Patent is hereby corrected as shown below:

In the Claims

Claim 7, Column 29, Line 20: "policy; wherein" should read "policy, wherein"

Signed and Sealed this
Thirty-first Day of August, 2021

Drew Hirshfeld
*Performing the Functions and Duties of the*
*Under Secretary of Commerce for Intellectual Property and*
*Director of the United States Patent and Trademark Office*